(12) United States Patent
Marquezan et al.

(10) Patent No.: US 11,082,894 B2
(45) Date of Patent: Aug. 3, 2021

(54) SYSTEM AND METHOD FOR ENHANCED SESSION MANAGEMENT IN NEXTGEN MOBILE CORE NETWORKS

(71) Applicant: Huawei Technologies Co., Ltd., Guangdong (CN)

(72) Inventors: Clarissa Marquezan, Munich (DE); Xueli An, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 85 days.

(21) Appl. No.: 16/524,766

(22) Filed: Jul. 29, 2019

(65) Prior Publication Data

US 2020/0029252 A1 Jan. 23, 2020

Related U.S. Application Data

(63) Continuation of application No. PCT/EP2017/052124, filed on Feb. 1, 2017.

(51) Int. Cl.
*H04W 36/00* (2009.01)
*H04W 36/22* (2009.01)
(Continued)

(52) U.S. Cl.
CPC ... *H04W 36/0022* (2013.01); *H04W 36/0027* (2013.01); *H04W 36/22* (2013.01); *H04W 76/15* (2018.02); *H04W 80/10* (2013.01)

(58) Field of Classification Search
None
See application file for complete search history.

(56) References Cited

U.S. PATENT DOCUMENTS

| 2013/0208703 A1 | 8/2013 | Sugimoto et al. |
| 2016/0037428 A1 | 2/2016 | Kanugovi et al. |

(Continued)

FOREIGN PATENT DOCUMENTS

| CN | 102006641 A | 4/2011 |
| CN | 105009621 A | 10/2015 |

(Continued)

OTHER PUBLICATIONS

3rd Generation Partnership Project; Technical Specification Group Services and System Aspects; Study on Architecture for Next Generation System (Release 14), 3GPP Standard; 3GPP TR 23.799 V14.0.0, Dec. 16, 2016, p. 1-522,XP051230010.

(Continued)

*Primary Examiner* — Scott M Sciacca
(74) *Attorney, Agent, or Firm* — Womble Bond Dickinson (US) LLP

(57) ABSTRACT

The present disclosure relates to an enhanced session model capable of managing the configuration and the usage of a single packet data unit session, which is an association between a user equipment and a packet data network entity and is composed of multiple transmission bearers between the access network and the core network. The latter comprises a session type manager entity adapted to control the connectivity of these transmission bearers whose assignment is either individual or shared, multiple user plane function entities, a session type database and a control plane function entity. The latter can be functionally separate from the session type manager entity or extended with its functionalities. The user equipment and the user plane function entities are individually extended with the functionalities of, respectively, a user session type extension entity and user plane session type extension entities, which all comprise a respective mapping table dedicated to the assignment.

6 Claims, 18 Drawing Sheets

(51) Int. Cl.
　　　*H04W 76/00*　　(2018.01)
　　　*H04W 80/10*　　(2009.01)
　　　*H04W 76/15*　　(2018.01)

(56)　　　　　References Cited

U.S. PATENT DOCUMENTS

| | | | |
|---|---|---|---|
| 2017/0231025 | A1 | 8/2017 | Futaki et al. |
| 2019/0182723 | A1* | 6/2019 | Sharma ............. H04W 36/0022 |
| 2019/0223060 | A1* | 7/2019 | Zhou ................. H04W 36/0022 |
| 2020/0053803 | A1* | 2/2020 | Youn ..................... H04W 76/10 |

FOREIGN PATENT DOCUMENTS

| | | | |
|---|---|---|---|
| JP | 2016506657 | A | 3/2016 |
| WO | 2014048499 | A1 | 4/2014 |
| WO | 2015185081 | A1 | 12/2015 |
| WO | 2017121475 | A1 | 7/2017 |

OTHER PUBLICATIONS

Michalopoulos Diomidis S et al, "User-plane multi-connectivity aspects in 5G", 2016 23rd International Conference on Telecommunications (ICT), IEEE,May 16, 2016, p. 1-5, XP032916866.

Ravanshid Azad et al, "Multi-connectivity functional architectures in 5G", 2016 IEEE International Conference on Communications Workshops (ICC), IEEE,May 23, 2016 (May 23, 2016), p. 187-192, XP032919911.

"3rd Generation Partnership Project; Technical Specification Group Services and System Aspects; System Architecture for the 5G System; Stage 2 (Release 15)", Jan. 26, 2017, 3GPP TS 23.501 v0.1.1, XP051227661.

Dziugas Baltrunas et al, "Multex: multiple PDN connections in LTE and beyond for enhanced routing and services", All Things Cellular, ACM, 2 Penn Plaza, Suite 701 New York NY 10121-0701 USA,Oct. 3, 2016, p. 13-18, XP058280185.

3GPP TR 22.891 V14.2.0 (Sep. 2016), 3rd Generation Partnership Project;Technical Specification Group Services and System Aspects;Feasibility Study on New Services and Markets Technology Enablers;Stage 1(Release 14), Sep. 2016. total 95 pages.

Rachid El Hattachi/Javan Erfanian (Editors), and 5G Initiative Team, NGMN 5G White Paper, Feb. 17, 2015, NGMN Alliance V1.0. total 125 pages.

NGMN Alliance, "5G Prospects—Key Capabilities to Unlock Digital Opportunities", Jul. 1, 2016. total 21 pages.

M. Scharf:"Multipath TCP (MPTCP) Application Interface Considerations", RFC 6897, Mar. 2013, total 31 pages.

3GPP TS 23A01 V13.2.0 (Mar. 2015),3rd Generation Partnership Project;Technical Specification Group Services and System Aspects;General Packet Radio Service (GPRS) enhancements for Evolved Universal Terrestrial Radio Access Network (E-UTRAN) access(Release 13),total 313 pages.

C. Perkins, Ed. Et al. Mobility Support in IPv6, RFC 6275, Jul. 2011, total 169 pages.

3GPP TS 23A01 V135.0 (Dec. 2015);3rd Generation Partnership Project;Technical Specification Group Services and System Aspects;General Packet Radio Service (GPRS) enhancements for Evolved Universal Terrestrial Radio Access Network (E-UTRAN) access(Release 13),total 337 pages.

W. Wang et al., "Proactive unnecessary handover avoidance scheme in LTE-A small cells," 2014 IEEE Wireless Communications and Networking Conference (WCNC), Istanbul, 2014, pp. 2214-2218.

V. V. Paranthaman et al., "Exploring Markov models for the allocation of resources for proactive handover in a mobile environment," Local Computer Networks Conference Workshops (LCN Workshops), 2015 IEEE 40th, Clearwater Beach, FL, 2015, pp. 855-861.

Hyung-Deug Bae et al.. Mode Switching for Device-to-Device Communication in LTE-A Network.MoMM '14 Dec. 8-10, 2014, Kaohsiung, Taiwan, total 4 pages.

SA WG2, Presentation of TR 23199: Study on Architecture for Next Generation System (Release 14) for Approval, 3GPP TSG SA #74 SP-160829, Dec. 7-9, 2016, total 7 pages.

\* cited by examiner

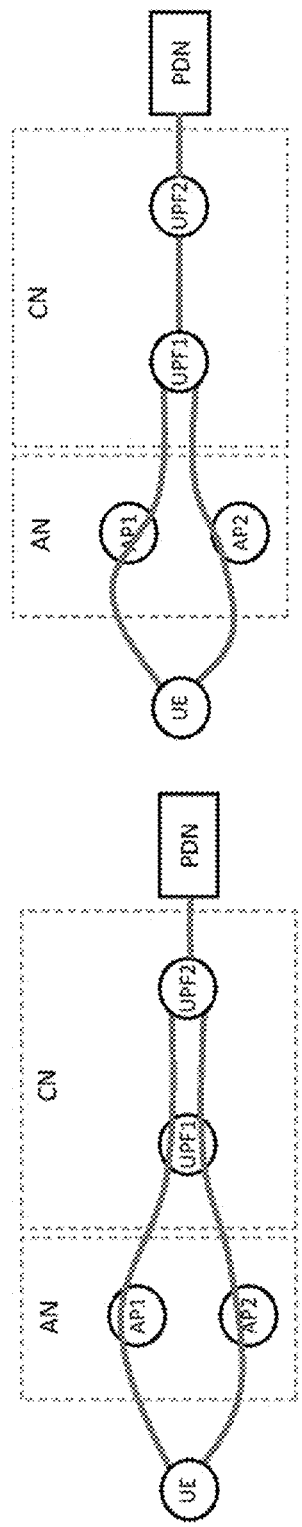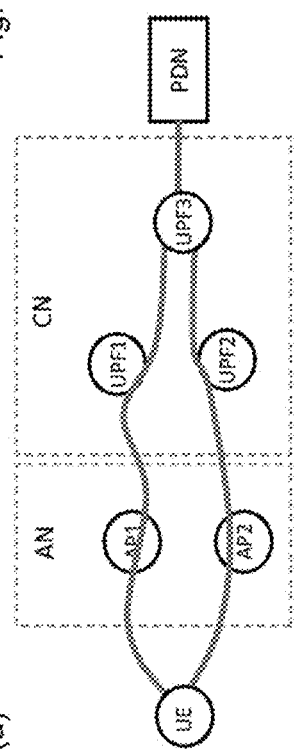
Fig. 1(a)
Fig. 1(b)
Fig. 1(c)

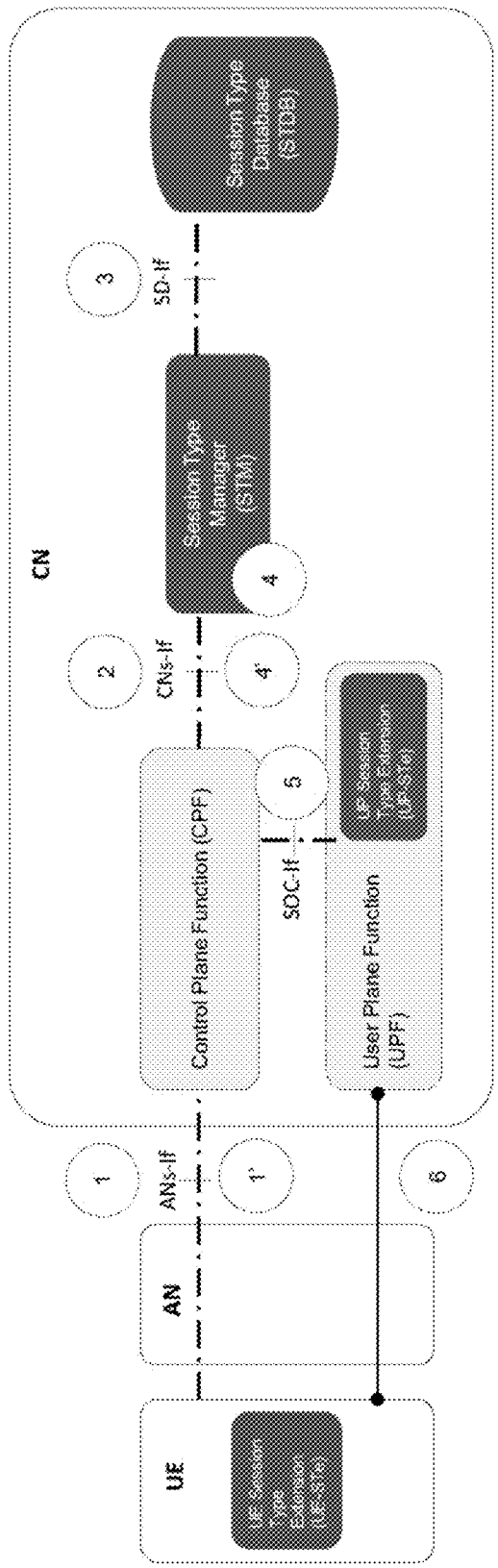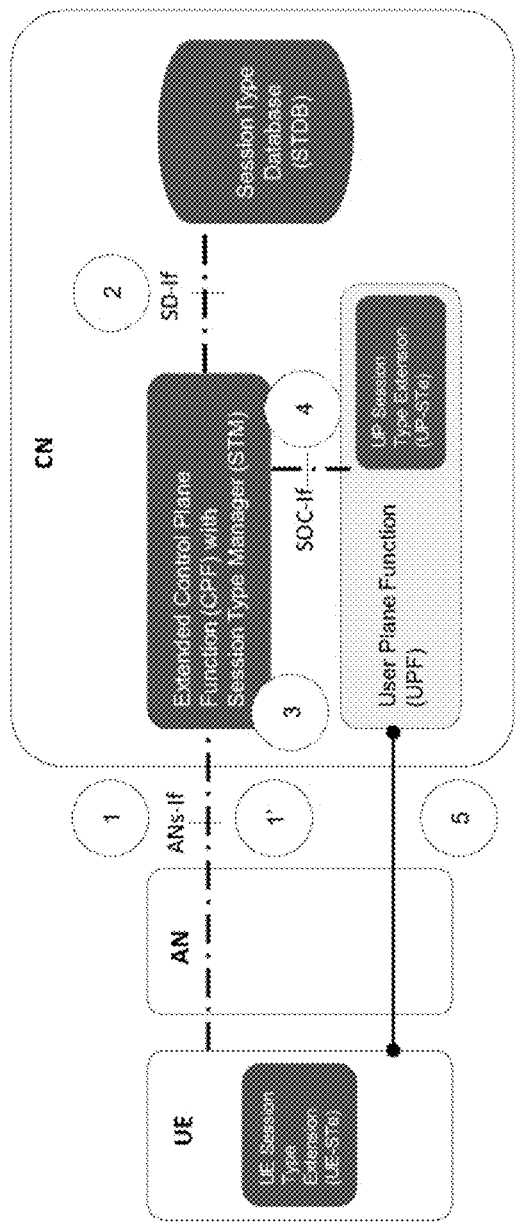

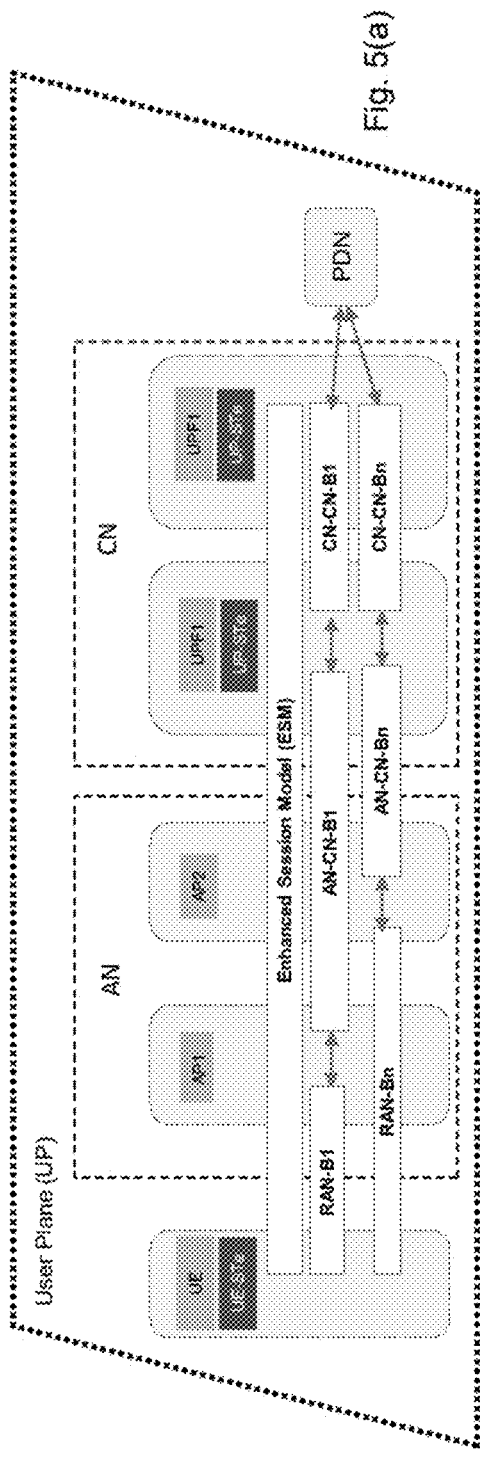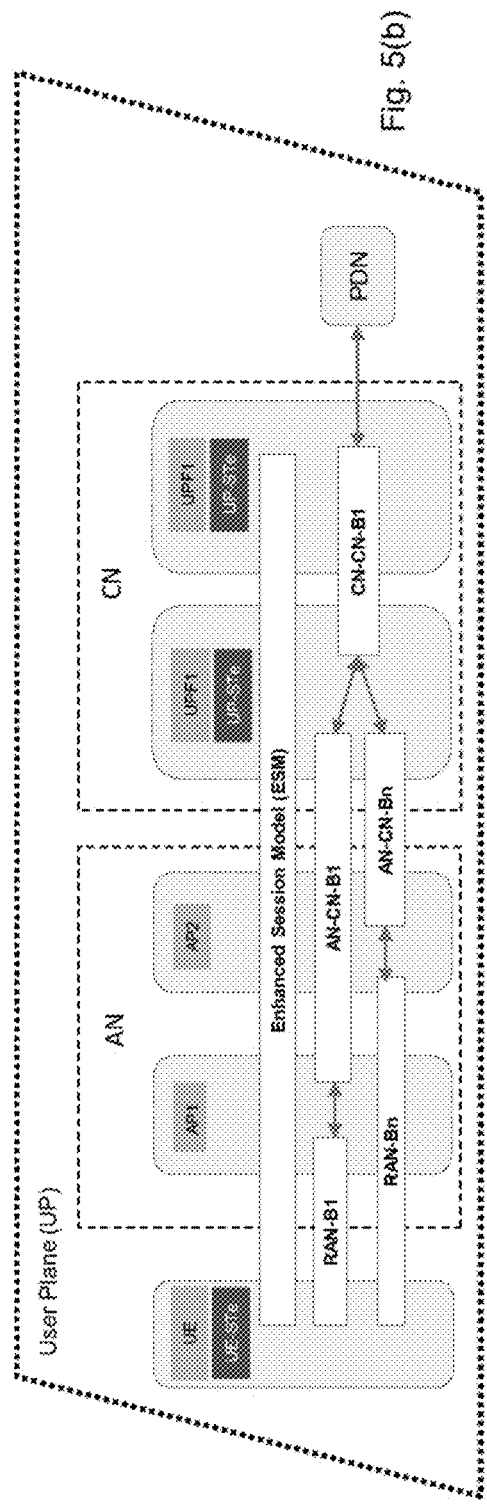

UE-STe Mapping Table UE_1

| Session ID | AP ID | PDN ID | UE UL Bearer ID | UE DL Bearer ID | Session Type | Operation Mode (only for Enhanced Session Model) |
|---|---|---|---|---|---|---|
| 1 | AP1 | IP_x | RAN-B1 | RAN-B1 | ESM | Pre-emptive - Primary |
| 1 | AP2 | IP_x | RAN-Bn | RAN-Bn | ESM | Pre-emptive - Secondary |

UP-STe Mapping Table UPF1

| Session ID | UE ID | PDN ID | UE UL Bearer ID | UE DL Bearer ID | Session Type | Operation Mode (only for Enhanced Session Model) |
|---|---|---|---|---|---|---|
| 1 | UE_1 | IP_x | CN-CN-B1 | AN-CN-B1 | ESM | Pre-emptive - Primary |
| 1 | UE_1 | IP_x | CN-CN-Bn | AN-CN-Bn | ESM | Pre-emptive - Secondary |

UP-STe Mapping Table UPF2

| Session ID | UE ID | PDN ID | UE UL Bearer ID | UE DL Bearer ID | Session Type | Operation Mode (only for Enhanced Session Model) |
|---|---|---|---|---|---|---|
| 1 | UE_1 | IP_x | IP_x | CN-CN-B1 | ESM | Pre-emptive - Primary |
| 1 | UE_1 | IP_x | IP_x | CN-CN-Bn | ESM | Pre-emptive - Secondary |

Fig. 6

UE-STe Mapping Table UE_1

| Session ID | AP ID | PDN ID | UE UL Bearer ID | UE DL Bearer ID | Session Type | Operation Mode (only for Enhanced Session Model) |
|---|---|---|---|---|---|---|
| 1 | AP1 | IP_x | RAN-B1 | RAN-B1 | ESM | Pre-emptive - Primary |
| 1 | AP2 | IP_x | RAN-Bn | RAN-Bn | ESM | Pre-emptive - Secondary |

UP-STe Mapping Table UPF1

| Session ID | UE ID | PDN ID | UE UL Bearer ID | UE DL Bearer ID | Session Type | Operation Mode (only for Enhanced Session Model) |
|---|---|---|---|---|---|---|
| 1 | UE_1 | IP_x | CN-CN-B1 | AN-CN-B1 | ESM | Pre-emptive - Primary |
| 1 | UE_1 | IP_x | CN-CN-B1 | AN-CN-Bn | ESM | Pre-emptive - Secondary |

UP-STe Mapping Table UPF2

| Session ID | UE ID | PDN ID | UE UL Bearer ID | UE DL Bearer ID | Session Type | Operation Mode (only for Enhanced Session Model) |
|---|---|---|---|---|---|---|
| 1 | UE_1 | IP_x | IP_x | CN-CN-B1 | ESM | Pre-emptive – Primary and Secondary |

Fig. 7

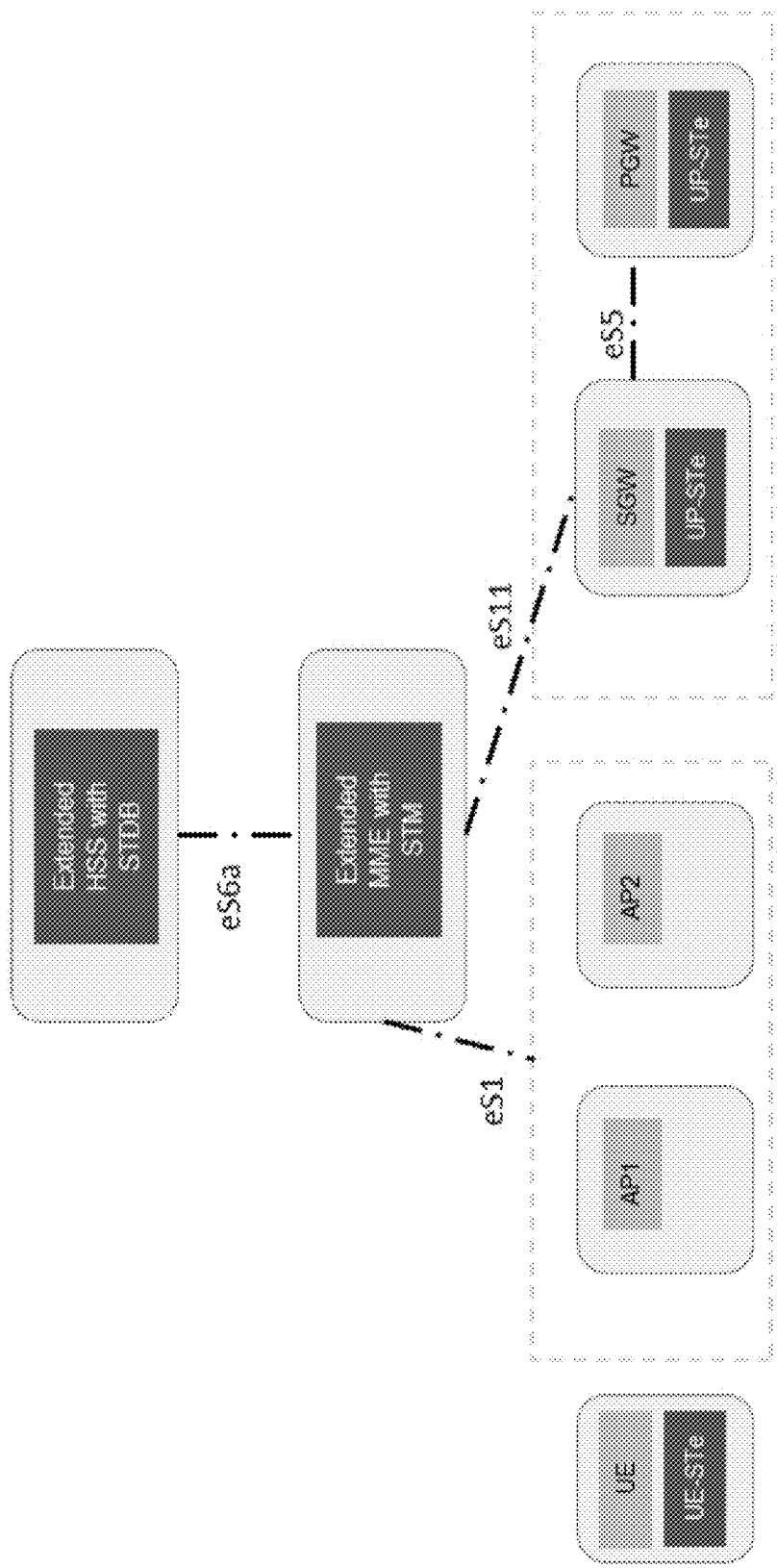

SYSTEM AND METHOD FOR ENHANCED SESSION MANAGEMENT IN NEXTGEN MOBILE CORE NETWORKS

CROSS-REFERENCE TO RELATED APPLICATIONS

This application is a continuation of International Application No. PCT/EP2017/052124, filed on Feb. 1, 2017, the disclosure of which is incorporated herein by reference in its entirety.

TECHNICAL FIELD

The present disclosure relates to the design of a mobile core network architecture for next generation systems, and more particularly to an architecture allowing the configuration and the usage of multiple transmission bearers belonging to a single packet data unit session.

BACKGROUND

According to the industry consensus, the 5th generation (5G) mobile technology will be standardized and deployed by 2020. Compared to the 4th generation (4G) mobile technology, the next generation network is expected to support many various use cases in terms of performance attributes, such as ultra-reliable communications for mission critical services, eHealth, public safety, real-time vehicle control, tactile Internet and connectivity for drones amongst others, as found in: 3GPP TR22.891, "Feasibility Study on New Services and Markets Technology Enablers", Release 14 and NGMN Alliance, "5G White Paper", Feb. 17, 2015. Supporting such an assorted set of use cases can be accomplished only by a flexible network, which is capable to adapt in order to achieve such heterogeneous performance, as found in: NGMN Alliance, "5G Prospects—Key Capabilities to Unlock Digital Opportunities", Jul. 1, 2016.

(WiFi EP)

For the next generation mobile system, a wide variety of devices is expected to support many new types of connections between various devices such as smartphones, wearable devices, smart cars, electronic household appliances and industrial equipment amongst others. Those devices will be characterized by very different performance requirements. In addition, the need to integrate communication services required by vertical industries will also increase such diversity of requirements. This diversity of requirement will also impose to the network the need to support and handle different models of mobility and session management for these various requirements. In current long term evolution (LTE) systems, there exists only one session model, namely the evolved packet system (EPS) bearer, which is applied for all the types of devices and services. There is also no diversity neither in mobility or session management, because the procedures to maintain the connectivity of a certain device, such as the active or idle mobility management procedures, have to execute the same changes at the radio access network (RAN) and at the core network (CN) to keep this single type of session connected regardless of the type of devices. As a consequence, the traffic of devices from enhanced mobile broadband (eMBB) use cases as well as from ultra-reliable low latency communication (uRLLC) use cases will be treated in the same way following the single EPS bearer model in current evolved packet core (EPC). For instance, the mobility management of both types of devices will be enforced in three steps. Firstly, a handover (HO) preparation, which has a high risk of packet loss and a high potential of HO failures. Secondly, a HO execution and thirdly, a HO completion, which can both introduce packet loss and increase latency in the communications. Services without strict transmission requirements (e.g., 10 ms latency and 99.9999% reliability), such as the services in the eMBB use cases, can tolerate possible losses during the HO management. However, services such as the services in the uRLLC use cases will not fully operate without session and mobility management models and procedures that can provide their requirements.

Multiple connectivity has been investigated in mobile core networks. For instance, the multipath transmission control protocol (MPTCP) described in RFC 6897 is based on the concept of using different internet protocol (IP) addresses or interfaces to split one transmission control protocol (TCP) connection into subflows. However, this solution cannot be applied to handle multiple transmission bearers as a single packet data unit (PDU) because the MPTCP works at the transport layer of applications once the interfaces are connected and available, so that it does not handle the RAN and core sessions. LTE dual connectivity involves two evolved node Bs (eNBs) providing radio resources to a given user equipment (UE) with active radio bearers, while a single S1-MME termination point exists for an UE between a mobility management entity (MME) and the evolved universal terrestrial radio access network (E-UTRAN) as found in: 3GPP TS 23.401 V13.2.0, "General Packet Radio Service (GPRS) enhancements for Evolved Universal Terrestrial Radio Access Network (E-UTRAN) access". Amongst these two eNBs, one is the master eNB and the other one is the secondary eNB. Therefore, the relationship between the two cells and the UE is a master cell and a secondary cell and there is, in the CN, still only one transmission bearer allocated for the primary and secondary cells.

SUMMARY

It is therefore an object of the present disclosure to provide an enhanced session model capable of managing the configuration and the usage of a single packet data unit session composed of multiple transmission bearers between the access network and the core network of a mobile communication network.

The object is achieved by the features of the independent claims. Further embodiments of the disclosure are apparent from the dependent claims, the description and the drawings.

A first aspect of the disclosure relates to a core network (CN) of a mobile communication network for managing multiple transmission bearers. The CN comprises a session type manager (STM) entity adapted to control the connectivity of the multiple transmission bearers between an access network (AN) of the mobile communication network and the CN based on a selective assignment of the multiple transmission bearers. Each transmission bearer is defined as a logical connection between two entities that transmit data traffic. The assignment of the multiple transmission bearers is amongst at least two transmission bearers of the same AN over respective at least two different access points (APs) at the AN and at least one transmission bearer of the CN, each transmission bearer belonging to a single packet data unit (PDU) session, which is defined as an association between a user equipment (UE) and a packet data network (PDN) entity. An enhanced session model (ESM) is defined as a model in which the UE has the at least two transmission bearers of the same AN and the at least one transmission bearer of the core network (CN) that all belong to the single PDU session.

In one embodiment, the assignment amongst the at least two transmission bearers of the AN and the at least one transmission bearer of the CN is selected by the STM entity as being either an individual assignment, in which each transmission bearer of the AN is individually connected to each respective transmission bearer of the CN, or a shared assignment, in which the at least two transmission bearers of the AN are together connected to a single transmission bearer of the CN.

In one embodiment, the CN comprises multiple user plane function (UPF) entities, which are defined as being network functions (NFs) used to process the user plane traffic in order to provide some network services, and a control plane function (CPF) entity, which is defined as being a network function (NF) used to perform a control plane function for the UE that is connected to the mobile communication network in order to exchange any data traffic with the PDN entity through the AN and the CN.

In one embodiment, the CPF entity is adapted to be either an entity functionally separate from the STM entity or an entity extended with the functionalities of the STM entity, adapted to receive a request for a session configuration, adapted to either communicate with the STM entity when the CPF entity is a functionally separate entity in order to request for a session configuration information about the enhanced session or determine the session configuration information about the enhanced session when the CPF entity is extended with the functionalities of the STM entity, and adapted to transmit, towards the UPF entities and the UE and based on the session configuration information, an information about how to set up or change the session of the UE. The request for the session configuration is either related to a session or service request from the UE or related to a need to change an existing session through a modification or a replacement of the existing session, the need to change the existing session being identified at the CPF entity, the STM entity or a session type database (STDB) of the CN. The session configuration information is related to an operation mode of the session of the UE to be set up, the operation mode being selected by the STM entity as either a preemptive mode or a simultaneous mode or a reliability mode. The preemptive mode is related to a reservation of resources in the multiple transmission bearers between the AN and the CN for the session of the UE to be set up, the simultaneous mode is related to a simultaneous usage of selected transmission bearers amongst the multiple transmission bearers between the AN and the CN, and the reliability mode is related to a redundancy on the transmission of data traffic of the selected transmission bearers amongst the multiple transmission bearers between the AN and the CN.

In one embodiment, the STM entity, when the CPF entity is an entity functionally separate from the STM entity or the CPF entity is extended with the functionalities of the STM entity, is adapted to interact with the STDB in response to the request for the session configuration information in order to retrieve an information about a type of session to be used by the UE, adapted to identify, based on the retrieved information about the type of session, the entities to be configured amongst the UPF entities of the CN and the APs of the AN in order to support the multiple transmission bearers to be associated with the data traffic of the UE once the enhanced session has been established, and adapted to determine the session configuration information about the enhanced session and transmit it towards the CPF entity.

In one embodiment, the UE is extended with the functionalities of a user session type extension (UE-STe) entity. The UE-STe entity is adapted to establish radio transmission bearers with the APs having the same technology, adapted to receive from the CPF entity the type of session to be used by the UE and the session configuration information, and adapted to determine how to use the transmission bearers of the AN for transmitting the uplink (UL) data traffic from the UE and receiving the downlink (DL) data traffic towards the UE.

In one embodiment, the UE-STe entity comprises a mapping table dedicated to the assignment of the multiple transmission bearers at the interface between the UE and the AN. The mapping table inside the UE-STe entity comprises multiple fields amongst which a field (e.g., session ID) about an identification of the session used by the UE, another field (e.g., session type) about the type of the identified session, another field (operation mode) about the operation mode of the identified session when the type of the identified session is the enhanced session, and another field (e.g., AP ID) about an identification of the APs associated with the identified session.

In one embodiment, each UPF entity is extended with the functionalities of a respective user plane session type extension (UP-STe) entity. The UP-STe is adapted to receive from the CPF entity the information about the type of session to be used by the UE and the session configuration information, and adapted to determine how to transmit the UL data traffic from the UE and the DL data traffic towards the UE based on all the received information.

In one embodiment, each UP-STe entity comprises a respective mapping table dedicated to the assignment of the multiple transmission bearers at the interface between the AN and the CN and inside the CN. Each mapping table inside the respective UP-STe entities comprises multiple fields amongst which a field (e.g., session ID) about an identification of the session used by the UE, another field (session type) about the type of the identified session, another field (e.g., operation mode) about the operation mode of the identified session when the type of the identified session is the enhanced session, and another field (e.g., UE ID) about an identification of the UE associated with the identified session.

In one embodiment, the UE-STe entity and the UP-STe entities are, in the preemptive mode, configured by the STM entity in order to use a single set (primary set) of transmission bearers for the transmission of the UL and DL data traffic while pre-reserving another single set (secondary set) of transmission bearers for the possible communications from and towards the UE.

In one embodiment, the UE-STe entity and the UP-STe entities are, in the simultaneous mode, configured by the STM entity with respective different policies in order to select the multiple transmission bearers between the AN and the CN to be simultaneously used, wherein the UE-STe and UP-STe entities either use a respective default policy for all the enhanced sessions or select for each enhanced session one amongst the available policies.

In one embodiment, the policy applied at the UP-Ste entity is either a static policy or an all-decide policy and the policy applied at the UE-STe entity is either a round-robin scheduling or an analysis of the conditions of the AN.

In one embodiment, the UE-STe entity and the UP-STe entities are, in the reliability mode, configured by the STM entity in order to duplicate the UL and DL data traffic.

The above object is also solved in accordance with a second aspect.

A second aspect of the disclosure relates to a session type manager (STM) entity of a core network (CN) of a mobile communication network according to the first aspect or any one of the implementations of the first aspect.

The above object is also solved in accordance with a third aspect.

A third aspect of the disclosure relates to a control plane function (CPF) entity of a core network (CN) of a mobile communication network according to the first aspect or any one of the implementations of the first aspect.

The above object is also solved in accordance with a fourth aspect.

A fourth aspect of the disclosure relates to a user plane function (UPF) entity of a core network (CN) of a mobile communication network according to the first aspect or any one of the implementations of the first aspect.

The above object is also solved in accordance with a fifth aspect.

A fifth aspect of the disclosure relates to a session type database (STDB) of a core network (CN) of a mobile communication network according to the first aspect or any one of the implementations of the first aspect.

The above object is also solved in accordance with a sixth aspect.

A sixth aspect of the disclosure relates to a mobile communication network comprising a core network (CN) as specified in the first aspect or any one of the implementations of the first aspect, an access network (AN) as specified in the first aspect, a user equipment (UE) as specified in the first aspect and a packet data network (PDN) entity as specified in the first aspect, and wherein the UE and the PDN entity communicate with each other through the AN and the CN.

The above object is also solved in accordance with a seventh aspect.

A seventh aspect of the disclosure relates to a method for managing multiple transmission bearers within a mobile communication network split into an access network (AN) and a core network (CN). The method comprises the step of controlling at a session type manager (STM) entity the connectivity of the multiple transmission bearers between the AN and the CN based on a selective assignment of the multiple transmission bearers. Each transmission bearer is defined as a logical connection between two entities that transmit data traffic. The assignment of the multiple transmission bearers is amongst at least two transmission bearers of the same AN over respective at least two different access points (APs) at the AN and at least one transmission bearer of the CN, each transmission bearer belonging to a single packet data unit (PDU) session, which is defined as an association between a user equipment (UE) and a packet data network (PDN) entity. An enhanced session model (ESM) is defined as a model in which the UE has the at least two transmission bearers of the same AN and the at least one transmission bearer of the core network (CN) that all belong to the single PDU session.

In one embodiment, the step of controlling the connectivity of the multiple transmission bearers between the AN and the CN comprises the step of receiving at a control plane function (CPF) entity a request for a session configuration, which is either related to a set-up of the session from the UE connected to the mobile communication network in order to exchange any uplink (UL) and downlink (DL) data traffic with the PDN entity through the AN and the CN or related to a need to change an existing session through a modification or a replacement of the existing session, the need being identified at the CPF entity, the STM entity or a session type database (STDB) interacting with the STM entity, the step of determining at the STM entity a session configuration information related to an establishment of the enhanced session, the step of receiving at the CPF entity the session configuration information, the step of deploying from the CPF entity the session configuration information towards the user plane function (UPF) entities of the CN, the APs of the AN and the UE, which are all adapted to support the multiple transmission bearers associated with the data traffic of the UE for the enhanced session, and the step of reserving for the enhanced session the resources of the multiple transmission bearers between the AN and the CN based on the deployed session configuration information.

In one embodiment, the step of determining the session configuration information comprises the step of defining at the STM entity an assignment of the multiple transmission bearers that are supported by the identified UPF entities and the APs.

In one embodiment, the assignment of the multiple transmission bearers is amongst at least two transmission bearers of the AN and at least one transmission bearer of the CN, which all belong to the single PDU.

In one embodiment, the step of defining the assignment of the multiple transmission bearers comprises the step of selecting either an individual assignment, in which each transmission bearer of the AN is individually connected to each respective transmission bearer of the CN, or a shared assignment, in which each transmission bearer of the AN is together connected to a single transmission bearer of the CN.

In one embodiment, the step of determining the session configuration information further comprises the step of selecting at the STM entity an operation mode of the UE amongst a preemptive mode, a simultaneous mode and a reliability mode, the preemptive mode being related to a reservation of resources in the multiple transmission bearers between the AN and the CN, the simultaneous mode being related to a simultaneous usage of selected transmission bearers of the multiple transmission bearers between the AN and the CN, and the reliability mode being related to a redundancy of the data traffic.

In one embodiment, the need to change an existing session through a modification of the existing session is caused by a handover (HO), the HO being triggered, when the UE is in the preemptive mode, in order to change from primary transmission bearers to secondary transmission bearers, the primary transmission bearers being used for the transmission of UL and DL data traffic and the secondary transmission bearers being pre-reserved for the possible communications from and towards the UE, and when the UE is in the simultaneous mode or in the reliability mode, in order to allow the UE to be connected to an AP that is associated with a session other than the existing enhanced session.

In one embodiment, the UE is extended with the functionalities of a respective user session type extension (UE-STe) entity. The UE-STe entity comprises a mapping table dedicated to the assignment of the multiple transmission bearers at the interface between the UE and the AN and is adapted to generate a UL data packet to be transmitted towards the PDN entity, adapted to check the mapping table in order to identify with which session the UL data packet is associated, adapted to then select, if the identified session is a session other than the enhanced session, the only transmission bearer available connecting the UE and the PDN entity and transmit the UL data packet towards the PDN entity, adapted to then check, if the identified session is the enhanced session, whether the operation mode is the preemptive mode, the simultaneous mode or the reliability mode, adapted to then select, if the operation mode is the preemptive mode, the primary transmission bearers and to transmit the UL data packet towards the PDN entity, adapted to then check, if the operation mode is the simultaneous mode, which policy should be applied, to select the transmission bearers based on the applied policy and to transmit the UL data packet towards the PDN entity, and adapted to then identify, if the operation mode is the reliability mode, all the transmission bearers associated with the enhanced session, to duplicate the UL data packet towards all the identified transmission bearers and to transmit the UL data packet towards the PDN entity.

In one embodiment, each UPF entity is extended with the functionalities of a respective user plane session type extension (UP-STe) entity. Each UP-STe entity comprises a respective mapping table dedicated to the assignment of the multiple transmission bearers at the interface between the AN and the CN and is adapted to receive a UL or DL data packet from the UE in the case of an UL data packet or from the PDN entity in the case of a DL data packet, adapted to check its mapping table in order to identify with which session the UL or DL data packet is associated, adapted to then select, if the identified session is a session other than the enhanced session, the only transmission bearer available connecting the UE and the PDN entity and to transmit the UL or DL data packet towards the UE in the case of a DL data packet or towards the PDN entity in the case of an UL data packet, adapted to then check, if the identified session is the enhanced session, whether the operation mode is the preemptive mode, the simultaneous mode or the reliability mode, adapted to then select, if the operation mode is the preemptive mode, the primary transmission bearers and to transmit the UL or DL data packet towards the UE in the case of a DL data packet or towards the PDN entity in the case of an UL data packet, adapted to then check, if the operation mode is the simultaneous mode, which policy other than the policy applied at the UE-STe entity should be applied, to select the transmission bearers based on the applied policy and to transmit the UL or DL data packet towards the UE in the case of a DL data packet or towards the PDN entity in the case of an UL data packet, and adapted to then identify, if the operation mode is the reliability mode, all the transmission bearers associated with the enhanced session, to duplicate the UL or DL data packet towards all the identified transmission bearers and to transmit the UL or DL data packet towards the UE in the case of a DL data packet or towards the PDN entity in the case of an UL data packet.

In one embodiment, the policy applied at the UP-STe entity is either a static policy or an all-decide policy and the policy applied at the UE-STe entity is either a round-robin scheduling or an analysis of the conditions of the AN.

The above object is also solved in accordance with an eighth aspect.

An eighth aspect of the disclosure relates to a computer program comprising a program code for performing the method according to the fourth aspect or the first implementation of the fourth aspect when executed on a computer. Accordingly, the method can be performed in an automatic and repeatable manner.

The computer program can be performed by the above apparatuses.

It should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that an embodiment of the disclosure can also be any combination of the dependent claims or above embodiments with the respective independent claim.

These and other aspects of the disclosure will be apparent and elucidated with reference to the embodiments described hereinafter.

DESCRIPTION OF DRAWINGS

In the following detailed portion of the present disclosure, the disclosure will be explained in more detail with reference to the exemplary embodiments shown in the drawings, in which:

FIG. 1(a), FIG. 1(b) and FIG. 1(c) show different kinds of organization of a single packet data unit (PDU) session between an access network (AN) and a core network (CN) of a mobile communication network within an enhanced session model (ESM) according to one embodiment;

FIG. 2(a) and FIG. 2(b) show the different entities and interfaces of the CN of the mobile communication network within the ESM in the case of FIG. 2(a): a CPF entity functionally separate from a STM entity and FIG. 2(b): a CPF entity extended with the functionalities of a STM entity, according to one embodiment;

FIG. 5(a) and FIG. 5(b) show the possible assignments of the multiple transmission bearers within the ESM amongst FIG. 5(a): an individual assignment and FIG. 5(b): a shared assignment, according to one embodiment;

FIG. 6 shows exemplary three mapping tables of the UE-STe entity inside the UE and the respective UP-STe entities inside UPF1 and UPF2 in the case of an individual assignment of the multiple transmission bearers within the ESM according to one embodiment;

FIG. 7 shows exemplary three mapping tables of the UE-STe entity inside the UE and the respective UP-STe entities inside UPF1 and UPF2 in the case of a shared assignment of the multiple transmission bearers within the ESM according to one embodiment;

FIG. 8(a): (B1, B2) corresponds to the set of respective primary and secondary transmission bearers wherein the primary transmissions bearers are being used and FIG. 8(b): (B1, B2) corresponds to the set of respective secondary and primary transmission bearers wherein the secondary transmission bearers are being used, according to one embodiment;

FIG. 15(a), FIG. 15(b) and FIG. 15(c) show different kinds of implementation of the present disclosure into a LTE architecture.

Figure 3:
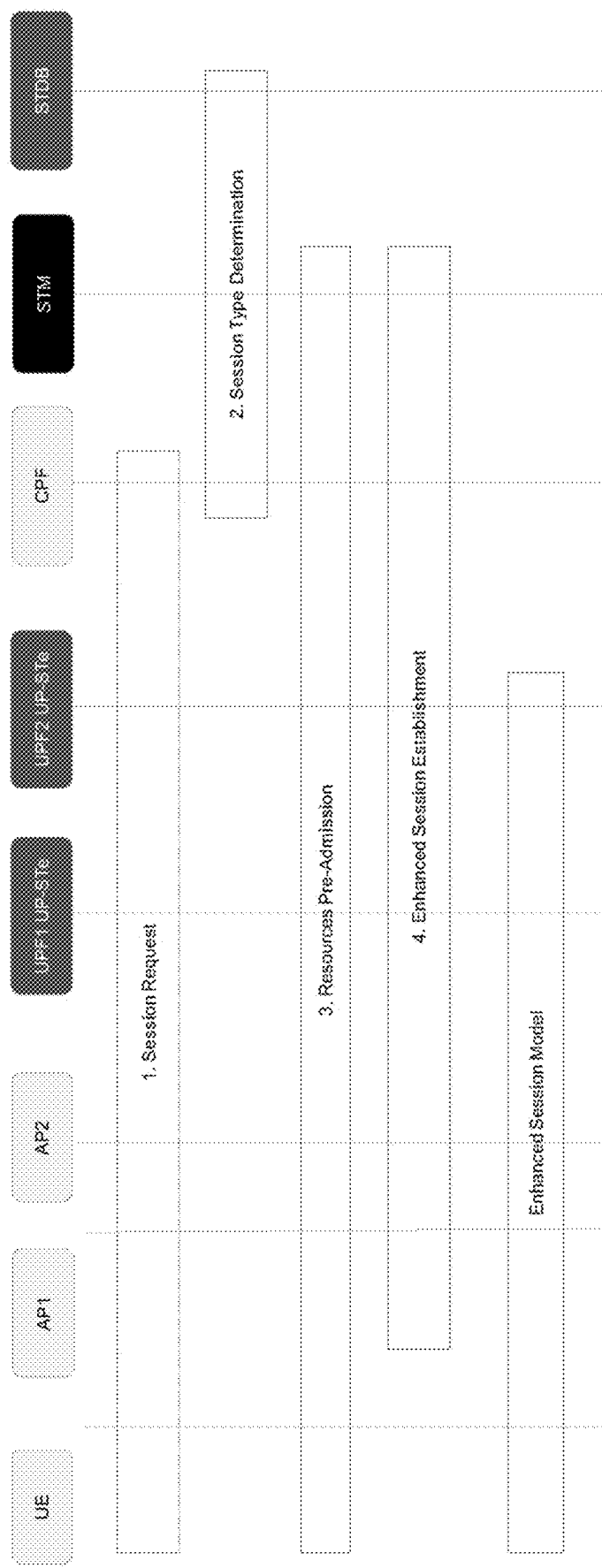
FIG. 3 shows a procedure of session configuration for the ESM when the procedure is device triggered according to one embodiment.

Identical reference signs are used for identical or at least functionally equivalent features.

DESCRIPTION OF EMBODIMENTS

FIG. 1(a), FIG. 1(b) and FIG. 1(c) show different kinds of organization of a single packet data unit (PDU) session between an access network (AN) and a core network (CN) of a mobile communication network within an enhanced session model (ESM) according to one embodiment.

The single PDU session can be defined as an association between a user equipment (UE) and a packet data network (PDN) entity, while the ESM can be defined as a model in which the UE has at least two transmission bearers of the same AN and at least one transmission bearer of the CN, all the transmission bearers belonging to the single PDU session and being defined as logical connections between respective pairs of entities that transmit data traffic.

Thus, FIG. 1(a), FIG. 1(b) and FIG. 1(c) illustrate the different configurations of linking the multiple bearers to each other within the proposed ESM.

FIG. 1(a) depicts two transmission bearers of the AN over respective two access points (AP1, AP2) intersecting at a first user plane function entity (UPF1) of the CN. In this configuration of the proposed ESM, the number of transmission bearers of the CN between the UPF1 and a second user plane function entity (UPF2) corresponds to the number of transmission bearers of the AN, so that there are two transmission bearers of the CN between the UPF1 and the UPF2. Thus, the suggested ESM is composed by the following tuples: (UE, AP1), (AP1, UPF1), (UE, AP2), (AP2, UPF1), (UPF1, UPF2) and (UPF2, PDN).

FIG. 1(b) depicts two transmission bearers of the AN over respective two access points (AP1, AP2) intersecting at the UPF1 of the CN. In this configuration of the proposed ESM, only one transmission bearer of the CN between the UPF1 and the UPF2 is responsible for transmitting the traffic from the two transmission bearers of the AN. Thus, the suggested ESM is composed by the following tuples: (UE, AP1), (AP1, UPF1), (UE, AP2), (AP2, UPF1), (UPF1_a, UPF2), (UPF1_b, UPF2) and (UPF2, PDN).

FIG. 1(c) depicts two transmission bearers of the AN over respective two access points (AP1, AP2) intersecting at a third user plane function entity (UPF3) of the CN other than the UPF1 and the UPF2. Thus, the suggested ESM is composed by the following tuples: (UE, AP1), (AP1, UPF1), (UPF1, UPF3) (UE, AP2), (AP2, UPF2), (UPF2, UPF3) and (UPF3, PDN).

All the aforementioned UPF entities (UPF1, UPF2, UPF3) can be defined as being network functions (NFs) used in the CN to process the user plane traffic in order to provide some network services. An example of UPF entity can be a mobility anchoring function entity.

FIG. 2(a) and FIG. 2(b) show the different entities and interfaces of the CN of the mobile communication network within the ESM in the case of FIG. 2(a): a control pane function (CPF) entity functionally separate from a session type manager (STM) entity and FIG. 2(b): a CPF entity extended with the functionalities of a STM entity, according to one embodiment. In the following, the term "CPF entity" without any further clarification refers to a CPF entity extended with the functionalities of the STM entity or a CPF entity functionally separate from the STM entity according to the context of the present disclosure.

These different entities and interfaces allow the mobile communication network, which comprises the UE, the AN, the CN and the PDN entity, to support the configuration and the usage of the proposed ESM.

As can be gathered from FIG. 2(a), these entities of the CN comprise a session type database (STDB), a UPF entity (for purpose of clarity, only one UPF entity has been depicted), a STM entity, and a CPF entity functionally separate from the STM entity.

As can be gathered from FIG. 2(b), these entities of the CN comprise a session type database (STDB), a UPF entity (for purpose of clarity, only one UPF entity has been depicted), and a CPF entity extended with the functionalities of the STM entity (also referred to as the "extended CPF entity" hereafter).

The CPF entity can be defined as being a NF used in the CN to perform a control plane function for the UE that is connected to the mobile communication network in order to exchange any data traffic with the PDN entity through the AN and the CN.

For its part, the STM entity can be defined as being a logical network entity that is adapted to control the connectivity of the multiple transmission bearers between the AN and the CN when the proposed ESM is used.

To enable the connectivity of the UE traffic, the type of session of the UE can be the session model used in the current 4G system, in which the UE is connected to only one AP of the same technology at a time, or the proposed ESM, in which the UE is connected to multiple APs of the same technology at a time. The STM entity (see FIG. 2(a)) or the functionalities of the STM entity (see FIG. 2(b)) are used whenever there is a need to set up a session of the UE in response to a session or service request from the UE or a need to change an existing session of the UE through a modification or a replacement of the existing session.

Referring to FIG. 2(a) wherein the overall steps are denoted by respective circles surrounding the numbers "1" to "6", the CPF entity (functionally separate from the STM entity) receives, from the UE and via the access network session interface (ANs-If), a request for a session configuration, which can be either related to a session or service request or related to a need to change an existing session through a modification or a replacement of the existing session (step 1). The actual trigger of the STM entity occurs when the CPF entity (functionally separate from the STM entity) contacts the STM entity via a control network session type interface (CNs-If) in order to request which type of session should be used for the given request to set up or change the UE session (step 2). Then, the STM entity interacts with the STDB via the session description interface (SD-If) in order to retrieve the information relating the UE with the type of session to be configured for such a UE (step 3). When the ESM is selected as the type of the UE session, the STM entity is also adapted to identify the multiple APs and UPF entities to be configured at the user plane (UP) in order to support the multiple transmission bearers of the AN and CN associated with the data traffic exchanged between the UE and the PDN entity for a given ESM set-up or ESM re-configuration (step 4). Once the session configuration information is defined by the STM entity, this information is propagated from the STM entity towards the CPF entity (functionally separate from the STM entity) via CNs-If (step 4'). Based on the information received from the STM entity, the CPF entity (functionally separate from the STM entity) then transmits the configuration defined by the STM entity towards each UPF entity, and more particularly towards each user plane session type extension (UP-STe) entity as depicted therein, via the session operation configuration interface (SOC-If) (step 5). In addition, the configuration of the ESM defined by the STM entity is also transmitted towards the UE, and more particularly towards the user session type extension (UE-Ste) entity as depicted in FIG. 2(*a*) and FIG. 2(*b*), via ANs-If, which allows the UE to use also the available transmission bearers for transmitting and receiving its data traffic (step 1'). Once the session is totally set up, the uplink (UL) data traffic from the UE and the downlink (DL) data traffic towards the UE will be transmitted using the set-up session (step 6).

Referring to FIG. 2(*b*) wherein the overall steps are denoted by respective circles surrounding the numbers "1" to "6", the CPF entity extended with the functionalities of the STM entity receives, from the UE and via the access network session interface (ANs-If), a request for a session configuration, which can either related to a session or service request or related to a need to change an existing session through a modification or a replacement of the existing session (step 1). Then, the extended CPF entity interacts with the STDB via the session description interface (SD-If) in order to retrieve the information relating the UE with the type of session to be configured for such a UE (step 2). When the ESM is selected as the type of the UE session, the extended CPF entity is also adapted to identify the multiple APs and UPF entities to be configured at the user plane (UP) in order to support the multiple transmission bearers of the AN and CN associated with the data traffic exchanged between the UE and the PDN entity for a given ESM set-up or ESM re-configuration (step 3). Based on the session configuration information defined by itself, the extended CPF entity then transmits the configuration towards each UPF entity, and more particularly towards each user plane session type extension (UP-STe) entity as depicted in FIG. 2(*a*) and FIG. 2(*b*), via the session operation configuration interface (SOC-If) (step 4). In addition, the configuration of the ESM defined by the extended CPF entity is also transmitted towards the UE, and more particularly towards the user session type extension (UE-Ste) entity as depicted therein, via the access network session interface (ANs-If), which allows the UE to use also the available transmission bearers for transmitting and receiving its data traffic (step 1'). Once the session is totally set up, the uplink (UL) data traffic from the UE and the downlink (DL) data traffic towards the UE will be transmitted using the set-up session (step 5).

It should be noted that, when the CPF entity is functionally separate from the STM entity, the need to change the existing session can be identified at the CPF entity, the STM or the STDB. On the other hand, when the CPF entity is extended with the functionalities of the STM entity, the need to change the existing session can be identified at the extended CPF entity or the STDB.

The UPF entities of the CN are individually extended with the functionalities of a respective UP-STe entity, which is adapted to receive, from the CPF entity and via SOC-If, the information about the type of session to be used by the UE and the session configuration information related to an operation mode of the session of the UE to be set up, and which is also adapted to determine how to transmit the UL data traffic from the UE and the DL data traffic towards the UE based on the whole received information.

The UE is extended with the functionalities of the UE-STe entity, which is adapted to establish radio transmission bearers with the APs having the same technology and receive, from the CPF entity and via ANs-If, the type of session to be used by the UE and the session configuration information related to the operation mode of the session of the UE to be set up, and which is also adapted to determine how to use the transmission bearers of the AN for transmitting the UL data traffic from the UE and receiving the DL data traffic towards the UE.

In the following, the procedure of session configuration, as introduced in the passage of the description related to FIGS. 2(*a*) and 2(*b*), will be described in more details.

To that extent, FIG. 3 shows a procedure of session configuration for the ESM when the procedure is device triggered according to one embodiment.

As depicted in FIG. 3, the initial action of session configuration is triggered when the UE sends a session (or service) request towards the CPF entity (step 1). The session request is then processed by the CPF entity, which interacts with the STM entity (step 2). When the STM entity receives the request to determine which kind of session should be used, it interacts with the STDB to query and retrieve the information about which session to be used for the given UE (step 2). In addition, the STM entity defines the configuration parameters (e.g., the kind of transmission bearers of the CN to be used) for the operation of the ESM to be configured inside the UP-STe entities (step 2). When the CPF entity receives all the information from the STM entity about how the ESM should be set up, it triggers a reservation of the resources in the multiple transmission bearers between the UE (i.e., the UE-STe entity) and the selected APs of the AN, between the selected APs and the UPF entities, and eventually between the UPF entities (i.e., the UP-STe entities) of the CN (step 3). Finally, when all the entities of the UP confirm the reservation of the resources for the requested ESM to the CPF entity, the requested session is considered as being established (step 4).

During the period during which the UE is connected to the mobile communication network, the type of its session can change as well as the resources associated with the transmission bearers. In this case, the procedure of session configuration for the ESM can be considered a procedure of session re-configuration for the ESM.

Figure 4:
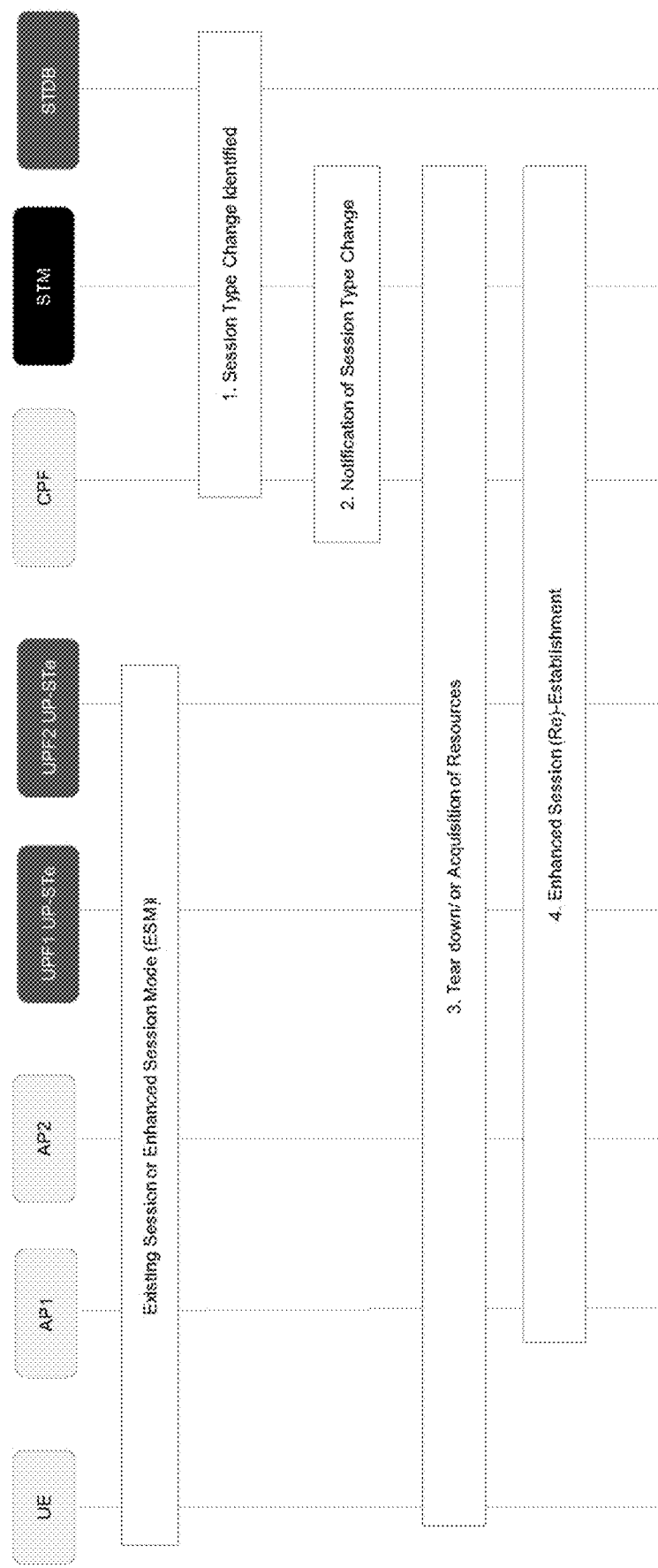
FIG. 4 shows a procedure of session configuration for the ESM when the procedure is network triggered according to one embodiment.

To that extent, FIG. 4 shows a procedure of session configuration for the ESM when the procedure is network triggered according to one embodiment.

Different scenarios can happen. In a first one, the UE can have a current 4G session model and the network can define that this ongoing UE session needs to be changed into the ESM. In a second one, the UE can have the ESM and some of the transmission bearers of the UE, and the AN can need to be changed amongst the APs. In a third one, the UE can have the ESM, and some of the transmission bearers of the CN can need to be changed amongst the UPFs, for example, due to anchoring point re-selection.

As depicted in FIG. 4, the identification that a session, either traditional or ESM, needs to be changed can occur following the aforementioned scenarios (step 1). The entities involved into this identification process are the CPF entity, the STM entity, or the STDB. The CPF entity can, for example, determine the change of the UP anchoring point. On the other hand, the STM entity can, for example, receive context information in order to optimize the quality of experience (QoE) of the UE and the stored information about the types of session used by the UE can be changed in the STDB. However, it will always be the STM entity that will make the decisions to change and the resulting changes shall be enforced in the session used by the UE. After determining the changes to be configured, the STM entity interacts again with the CPF entity so that the changes can actually be notified and propagated towards the entities of the UP (step 2). The CPF entity interacts with the UPF entities in order to execute the changes at the UP-STe entities of the UPF entities related to the session of the UE (step 3). Although different scenarios for the changes have been mentioned, all of them will execute this step (step 3) of the procedure wherein the old resources are tear down and new resources are allocated to the changes in order to enforce the new or renewed ESM. The interactions amongst the entities of the control plane (CP) and the UP are finalized and the ESM is finally re-established, while the STM entity has an updated information about the enforced changes in the session of the UE (step 4).

The connectivity of the multiple transmission bearers between the AN and the CN is controlled by the STM entity based on a selective assignment of the multiple transmission bearers. Two kinds of assignment can be selected by the STM entity. This selective assignment is amongst at least two transmission bearers of the same AN over respective at least two different access points (APs) at the AN and at least one transmission bearer of the CN, each transmission bearer belonging to the single packet data unit (PDU) session.

FIG. 5(*a*) and FIG. 5(*b*) show shows the possible assignments of the multiple transmission bearers within the ESM amongst FIG. 5(*a*): an individual assignment and FIG. 5(*b*): a shared assignment, according to one embodiment.

In FIG. 5(*a*), the selected assignment is an individual assignment, in which each transmission bearer of the AN is individually connected to each respective transmission bearer of the CN. As depicted therein, there is an association between the transmission bearer CN-CN-B1 (through UPF1 and UPF2 of the CN) and the transmission bearer AN-CN-B1 (through AP1 and AP2 of the AN and UPF1 of the CN). As also depicted therein, there is another association between other two transmission bearers, namely the transmission bearer CN-CN-Bn (through UPF1 and UPF2 of the CN) and the transmission bearer AN-CN-Bn (through AP2 of the AN and UPF1 of the CN). Thus, this use of multiple transmission bearers of the CN can, for example, enable load balancing of the data traffic of the UE in the core network or guarantee more reliability.

In FIG. 5(*b*), the selected assignment is a shared assignment, in which the at least two transmission bearers of the AN are together connected to a single transmission bearer of the CN. In this case, the STM entity determines that the transmission bearers of the CN can be simplified and that the multiple transmission bearers of the AN will share the same transmission bearer of the CN. As depicted therein, the transmission bearer AN-CN-B1 (through AP1 and AP2 of the AN and UPF1 of the CN) and the transmission bearer AN-CN-Bn (through AP2 of the AN and UPF1 of the CN) are both associated with the single transmission bearer CN-CN-B1 (through UPF1 and UPF2). The decision at the STM entity to share a same transmission bearer of the CN can be motivated by an indication of limited resources among the UPF entity.

As depicted in both FIGS. 5(*a*) and 5(*b*), there is also an association between the radio access network (RAN) transmission bearer RAN-B1 (through the UE and AP1 of the AN) and the transmission bearer AN-CN-B1 (through AP1 and AP2 of the AN and UPF1 of the CN) and another association between the RAN transmission bearer RAN-Bn (through the UE and AP1 and AP2 of the AN) and the transmission bearer AN-CN-Bn (through AP2 of the AN and UPF1 of the CN).

Furthermore, the UE-STe entity comprises a mapping table dedicated to the assignment of the multiple transmission bearers at the interface between the UE and the AN, and each UP-STe entity comprises a respective mapping table dedicated to the assignment of the multiple transmission bearers at the interface between the AN and the CN and inside the CN. Thereby, the assignment of the multiple transmission bearers between the AN and the CN within the ESM can be kept.

The mapping tables inside the UE-STe entity and each UP-STe entity share multiple fields amongst which:

a field denoted by "session ID", which is related to an identification of the session used by the UE;

a field denoted by "PDN ID", which is related to an identification of the UE associated with the use of the session ID;

a field denoted by "UE UL bearer ID", which is related to an identification of the assignment or mapping of the data traffic to be transmitted from the UE towards the PDN entity;

a field denoted by "UE DL bearer ID", which is related to an identification of the assignment or mapping of the data traffic to be transmitted from the PDN entity towards the UE;

a field denoted by "session type", which is related to an indication of the type of the session used by the UE and identified by the "session ID" field; and a field denoted by "operation mode (only for enhanced session model)", which is related to the operation mode of the identified session when the type of the identified session is the enhanced session. The operation mode can be either a preemptive mode or a simultaneous mode or a reliability mode. These three operation modes, which can be configured by the STM entity for the ESM, are related to the manner in which the STM entity determines how the UE-STe entity and the UP-STe entities will use the multiple transmission bearers of the ESM between the AN and the CN. More precisely, the preemptive mode is related to a reservation of resources in the multiple transmission bearers between the AN and the CN for the identified session. The simultaneous mode is related to a simultaneous usage of selected transmission bearers amongst the multiple transmission bearers between the AN and the CN, and the reliability mode is related to a redundancy on the transmission of data traffic of the selected transmission bearers amongst the multiple transmission bearers between the AN and the CN.

In addition, the mapping table inside the UE-STe entity has another field denoted by "AP ID", which is related to an identification of the APs associated with the identified session. On the other hand, the mapping table inside the UP-STe entity has another field denoted by "UE ID", which is related to an identification of the UE associated with the identified session.

All those mapping tables illustrate how the UE-STe and UP-STe entities of FIG. 3 are configured by the STM entity in order to map the UL and DL data traffic of the UE.

Referring to FIG. 5(*a*), FIG. 6 shows exemplary three mapping tables of the UE-STe entity inside the UE (denoted by "UE_1") and the respective UP-STe entities inside UPF1 and UPF2 in the case of an individual assignment of the multiple transmission bearers within the ESM.

Referring to FIG. 5(b), FIG. 7 shows exemplary three mapping tables of the UE-STe entity inside the UE (denoted by "UE_1") and the respective UP-STe entities inside UPF1 and UPF2 in the case of a shared assignment of the multiple transmission bearers within the ESM.

As can be gathered from the exemplary mapping tables of FIGS. 6 and 7, the operation mode of the identified session field is the preemptive mode. In that mode, the STM entity indicates which are the resources in the multiple transmission bearers between the AN and the CN that need to be reserved for the ESM associated with the UE, and configures the UE-STe and UP-STe entities to use only one of the set of the reserved resources at a time.

Figure 8A:
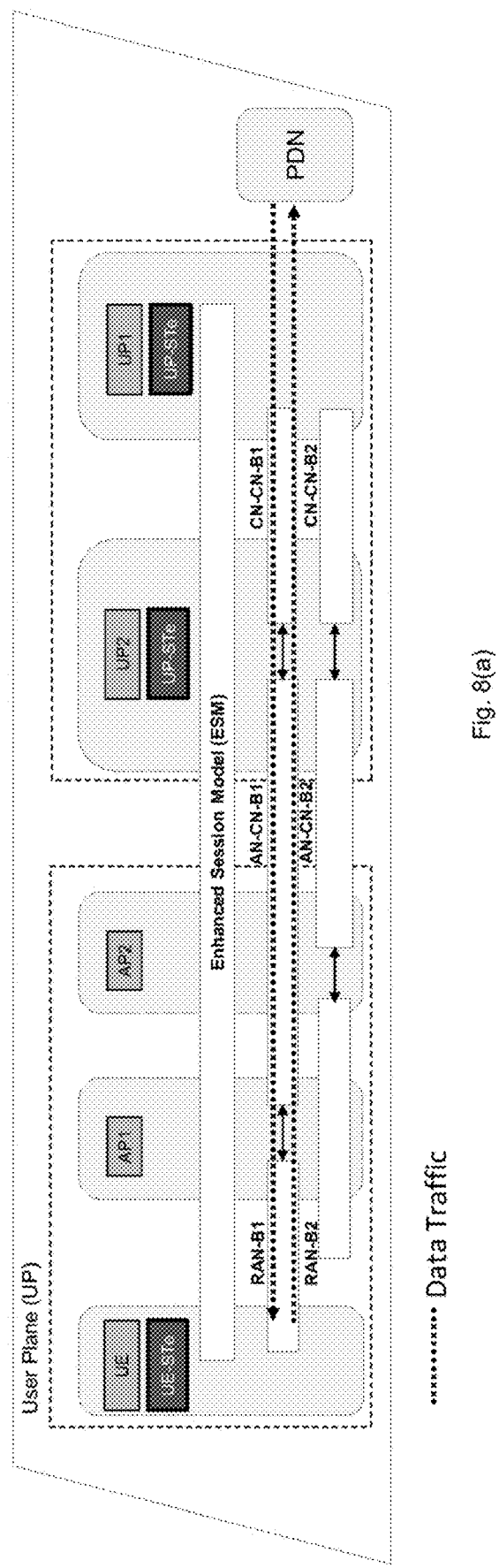
FIG. 8(a) and FIG. 8(b) show a usage of two sets (B1, B2) of multiple transmission bearers under the preemptive mode in the exemplary case of an individual assignment, where
Figure 8B:
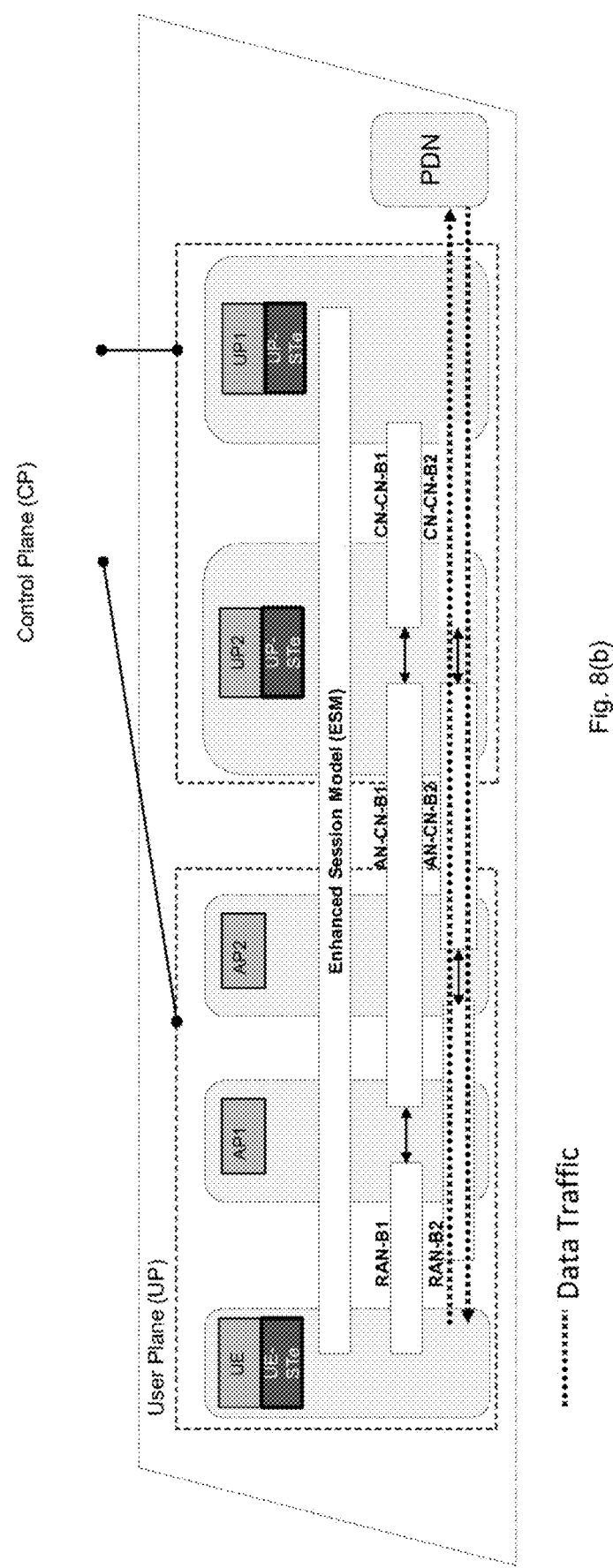

To that extent, FIG. 8(a) and FIG. 8(b) show a usage of two sets (B1, B2) of multiple transmission bearers (RAN-B1, AN-CN-B1, CN-CN-B1, RAN-B2, AN-CN-B2, CN-CN-B2) under the preemptive mode in the exemplary case of an individual assignment as illustrated in FIG. 5(a), where FIG. 8(a): (B1, B2) corresponds to the set of respective primary and secondary transmission bearers and FIG. 8(b): (B1, B2) corresponds to the set of respective secondary and primary transmission bearers. It should be noted that, in another exemplary case, the assignment can also be a shared assignment as illustrated in FIG. 5(b).

In FIG. 8(a), when the entities of the UP are set up to use the ESM in the preemptive operation mode, there is a set of primary transmission bearers (RAN-B1, AN-CN-B1, CN-CN-B1) that are used for all the transmissions of data traffic between the UE and the PDN entity, while another set of secondary transmission bearers (RAN-B2, AN-CN-B2, CN-CN-B2) will be pre-reserved for the possible UE communications. The resources for the secondary transmission bearers (RAN-B2, AN-CN-B2, CN-CN-B2) can be pre-reserved in such a manner that all the resources in both the AN and the CN are reserved for those secondary transmission bearers (RAN-B2, AN-CN-B2, CN-CN-B2) and are just awaiting the activation at the UE side. Alternatively, these resources can be pre-reserved in such a manner that only the resources at the CN are pre-reserved for the secondary transmission bearers (RAN-B2, AN-CN-B2, CN-CN-B2) and once the need to activate such resources is detected, both the AN and UE resources are then allocated.

Whatever the manner the resources from the secondary transmission bearers (RAN-B2, AN-CN-B2, CN-CN-B2) will be pre-reserved, the UP-STe entities will have the information about the secondary transmission bearers (RAN-B2, AN-CN-B2, CN-CN-B2). Nonetheless, the configuration sent by the STM entity via SOC-If will determine that only the primary transmission bearers (RAN-B1, AN-CN-B1, CN-CN-B1) shall be used for the transmission of the UL and DL data traffic. Referring to FIG. 6, this information is indicated as entry in the column of the field denoted by "operation mode (only for enhanced session model)" of the UP-STe mapping table. Likewise, the UE-STe mapping table will be configured with at least one transmission bearer indicating the preemptive mode and the information that this at least one transmission bearer is the primary one (RAN-B1, AN-CN-B1, CN-CN-B1). It should however be noted that, depending on the manner in which the secondary transmission bearers (RAN-B2, AN-CN-B2, CN-CN-B2) are reserved and established, the UE-STe entity may or may not have the secondary transmission bearers (RAN-B2, AN-CN-B2, CN-CN-B2) registered in its mapping table.

In FIG. 8(b) and with respect to FIG. 8(a), the set of primary transmission bearers has been changed from B1 to B2 so that the transmission of the UL and DL data traffic is achieved by the transmission bearers: RAN-B2, AN-CN-B2 and CN-CN-B2, while the set of secondary transmission bearers has been changed from B2 to B1 so that the resources are pre-reserved for the transmission bearers: RAN-B1, AN-CN-B1 and CN-CN-B1. This change involves the interaction between the UP-STe entities and the entities of the control plane (CP) (i.e., the CPF and STM entities) in order to update the assignment or mapping of the transmission bearers to be used for transmitting the data traffic of the UE.

In the case where the operation mode of the identified session field of the mapping tables is the simultaneous mode, the multiple transmission bearers between the AN and the CN are then configured at the entities of the UP (i.e., at the UE-STe and UP-STe entities) in order to be simultaneously used. The decision about which transmission bearers should be used is made based on policies deployed at the respective UP-STe and UE-STe entities.

Figure 9:
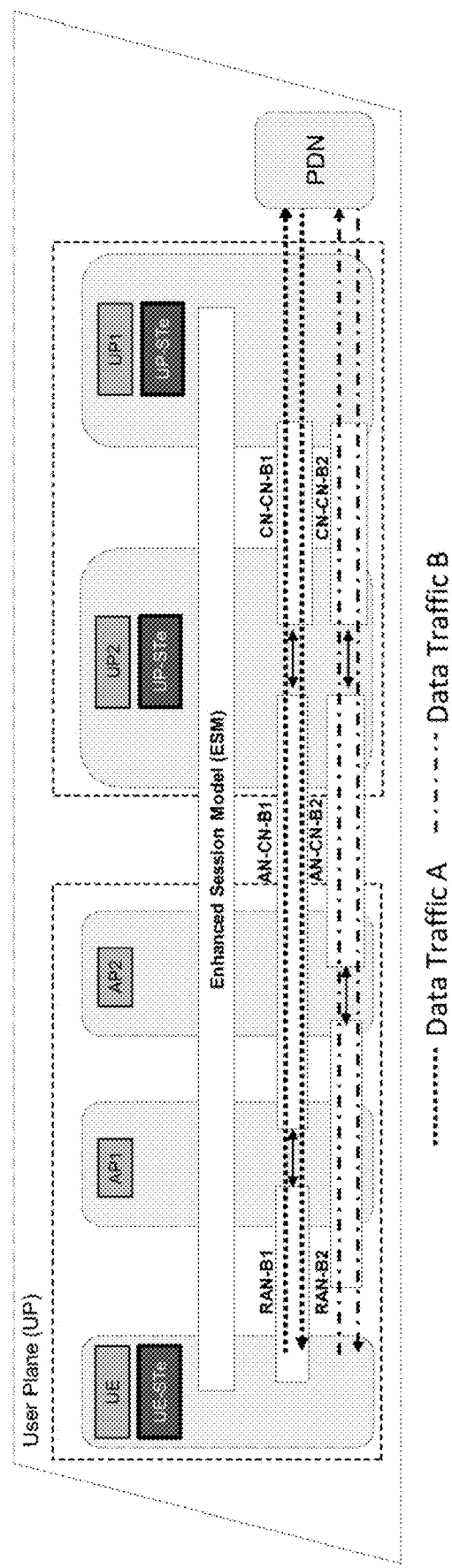
FIG. 9 shows a usage of multiple transmission bearers under a simultaneous mode in the exemplary case of an individual assignment according to one embodiment.

FIG. 9 shows a usage of multiple transmission bearers (RAN-B1, AN-CN-B1, CN-CN-B1; RAN-B2, AN-CN-B2, CN-CN-B2) under the simultaneous mode in the exemplary case of an individual assignment as illustrated in FIG. 5(a). It should however be noted that, in another exemplary case, the assignment can also be a shared assignment as illustrated in FIG. 5(b).

Two streams of data traffic from and towards the UE, denoted by data traffic A and data traffic B, are depicted in FIG. 9. The first stream is transmitted via the transmission bearer RAN-B1 through the use of AP1 and the second stream is transmitted via the transmission bearer RAN-B2 through the use of AP2. The UE-STe and UP-STe entities are the entities that define which resources (i.e., which transmission bearers) will be used for the respective UL and DL data traffic. Thus, the UP-STe entities decide through which transmission bearers the UL and DL data traffic should be propagated, while the UE-STe entity defines only which transmission bearer should be used for the UL data traffic. It should be noted that in the case of the shared assignment of the transmission bearers, no decision about which transmission bearers should be used is necessary. However, in the case of the present individual assignment, the decision about which transmission bearers towards the UE should be used can be made by any of the UPF entities extended with the functionalities of their respective UP-STe entities and located in the path towards and from the UE. The decision about the manner in which each UP-STe will behave and the policy for transmission is made by the STM entity, propagated towards the CPF entity that controls the UP-STe entities via CNs-If (in the case where the CPF entity is an entity functionally separate from the STM entity) and that in turn configures with said policy for transmission the controlled UP-STe entities via SOC-If. The UE-STe entity is also configured by the STM entity so that the UP-STe entities and the UE-STe entity are configured with respective different policies in order to select the multiple transmission bearers between the AN and the CN to be simultaneously used. The UE-STe and UP-STe entities can either use a respective default policy for all the enhanced sessions (i.e., ESMs) or select for each enhanced session (i.e., each ESM) one amongst the available policies. Amongst other policies, the policy applied at the UP-Ste entity can be either a static policy or an all-decide policy and the policy applied at the UE-STe entity can be either a round-robin scheduling or an analysis of the conditions of the AN.

When the static policy is applied at the UP-STe entities, the STM entity determines at the ESM set-up or ESM re-configuration the exact assignment of the transmission bearers for the UL and DL data traffic of the UE. Thereby, if there are other UP-STe entities on the path towards the UE, these other UP-STe entities will be configured through the entry in the mapping table of the corresponding UP-STe entities with the exact assignment of the transmission bearers. This kind of policy enables a static configuration of the transmission bearers because it is defined by the STM entity at a time when the ESM is set up or changed.

When the all-decide policy is applied at the UP-STe entities, the STM entity determines that all the UP-STe entities on the path of the UL and DL data traffic have the ability to decide which further transmission bearer will be used for the next hop in the chain of the UP-STe entities. Inside each UP-STe entity that will make a decision, different strategies can be applied, such as the round-robin, in order to analyze whether there is any congestion at the transmission bearers and prioritize one transmission bearer at the expense of another. This kind of policy enables a dynamic configuration of the mapping tables at the UP-STe entities without the need to trigger a re-configuration procedure. Nevertheless, the involved UP-STe entities need to have the capacity of deciding when to change the assignment of the multiple transmission bearers.

When the policy of the round-robin scheduling or the analysis of the conditions of the AN amongst others is applied at the UE-STe entity in order to change the UL transmission bearer to be used, there can be two ways for the STM entity to configure the UE-STe entity with each of those policies. In a first way, the policies can be hardcoded at the UP-STe entities so that the STM entity can only define that the UE session will operate with a simultaneous operation mode, and it will be up to the hardcoded definitions at the UE-STe entity to apply the policy. In a second way, the STM entity can define the simultaneous operation mode and which policy should be used at the UE-STe entity. The corresponding information is then transmitted from the STM entity towards the CPF entity via CNs-If (in the case where the CPF entity is an entity functionally separate from the STM entity) and the CPF entity can configure the UE-STe entity via ANs-If.

In the case where the operation mode of the identified session field of the mapping tables is the reliability mode, the same data packets of the UL and DL data traffic are, for redundancy reasons, transmitted via all the transmission bearers of the AN and the CN forming the ESM.

Figure 10:
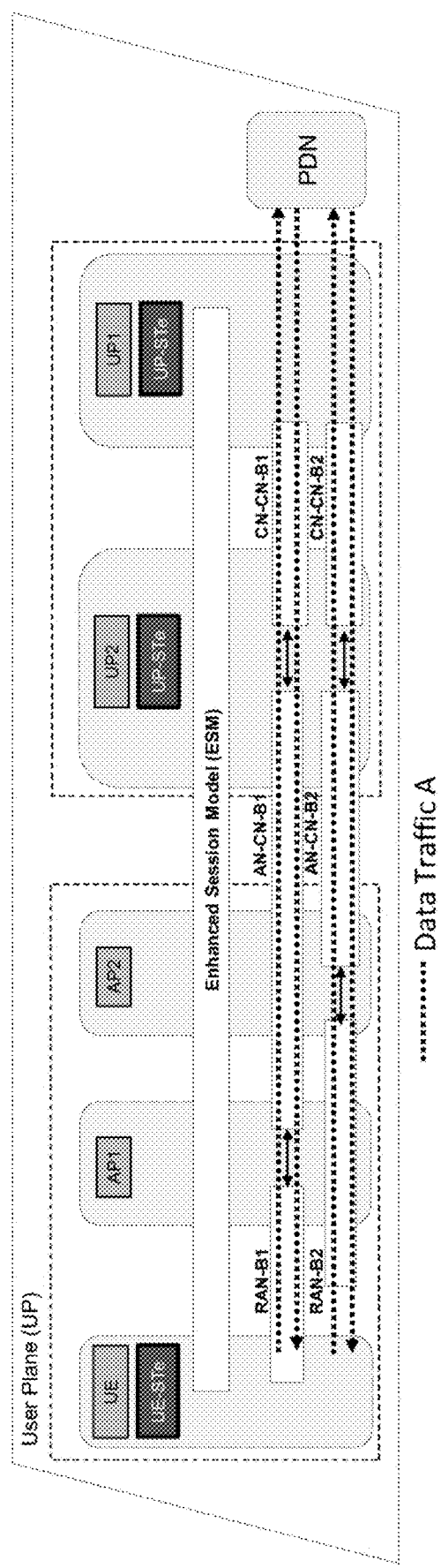
FIG. 10 shows a usage of multiple transmission bearers under a reliability mode in the exemplary case of an individual assignment according to one embodiment.

FIG. 10 shows a usage of multiple transmission bearers (RAN-B1, AN-CN-B1, CN-CN-B1; RAN-B2, AN-CN-B2, CN-CN-B2) under the reliability mode in the exemplary case of an individual assignment as illustrated in FIG. 5(*a*). It should however be noted that, in another exemplary case, the assignment can also be a shared assignment as illustrated in FIG. 5(*b*).

In the reliability mode, the UE-STe entity will always duplicate the UL data traffic and send it towards the PDN entity via the multiple transmission bearers of the AN. As regards the DL data traffic sent from the PDN entity towards the UE, it depends on the type of assignment of the multiple transmission bearers being used. When the individual assignment as illustrated in FIG. 10 is used, the UP-STe entities will check their respective mapping table, determine the transmission bearers associated with the UE and PDN entity for the DL data traffic, and thus duplicate the data packet of the DL data traffic towards all the configured transmission bearers involved in the DL data traffic within the ESM.

Thus, based on the above, the UE-STe and UP-STe entities have to support the different operation modes configured by the STM entity and have to be able to identify how each data packet should be processed. The UE-STe entity defines only how the UL data traffic should be handled, while the UP-STe entities can define for the UL and DL data traffic which transmission bearers should be used.

Figure 11:
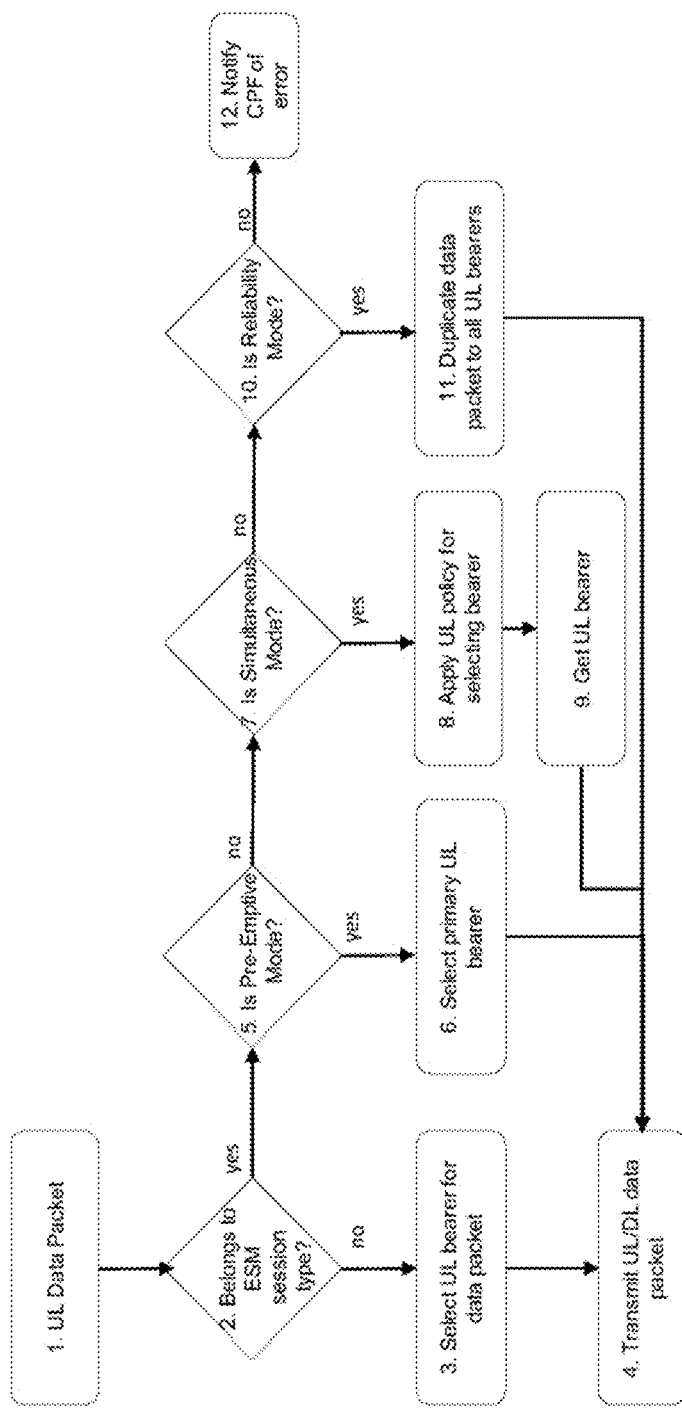
FIG. 11 shows a flow diagram illustrating the processing steps of a UE-STe entity based on an operation mode of the UE according to one embodiment.

FIG. 11 shows a flow diagram illustrating the processing steps of a UE-STe entity based on an operation mode of the UE according to one embodiment.

As depicted in FIG. 11, the UE-STe entity, which comprises a mapping table dedicated to the assignment of the multiple transmission bearers at the interface between the UE and the AN, is adapted to perform the following steps:

it generates a UL data packet (to be transmitted towards the PDN entity) in a first step (denoted by the number "1");

it checks its mapping table in order to identify with which session the UL data packet is associated in a second step (denoted by the number "2");

if the identified session is a session other than the enhanced session (i.e., the ESM), then it selects the only transmission bearer available connecting the UE and the PDN entity in a third step (denoted by the number "3") and it transmits the UL data packet towards the PDN entity in a fourth step (denoted by the number "4");

if the identified session is the enhanced session (i.e., the ESM), then it checks whether the operation mode is the preemptive mode in a fifth step (denoted by the number "5"), and if the operation mode is the preemptive mode, then it selects the primary transmission bearers in a sixth step (denoted by the number "6") before transmitting the UL data packet towards the PDN entity;

if it checks in a seventh step (denoted by the number "7") that the operation mode is not the preemptive mode but the simultaneous mode, then it checks which policy should be applied in an eighth step (denoted by the number "8") and selects the transmission bearers based on the applied policy in a ninth step (denoted by the number "9") before transmitting the UL data packet towards the PDN entity;

if it checks in a tenth step (denoted by the number "10") that the operation mode is not the simultaneous mode but the reliability mode, then it identifies all the transmission bearers associated with the enhanced session (i.e., the ESM) and duplicates the UL data packet towards all the identified transmission bearers in an eleventh step (denoted by the number "11") before transmitting the UL data packet towards the PDN entity;

if it checks in a twelfth step (denoted by the number "12") that the operation mode is neither the preemptive mode nor the simultaneous mode nor the reliability mode, then it sends an error notification towards the CPF entity.

Figure 12:
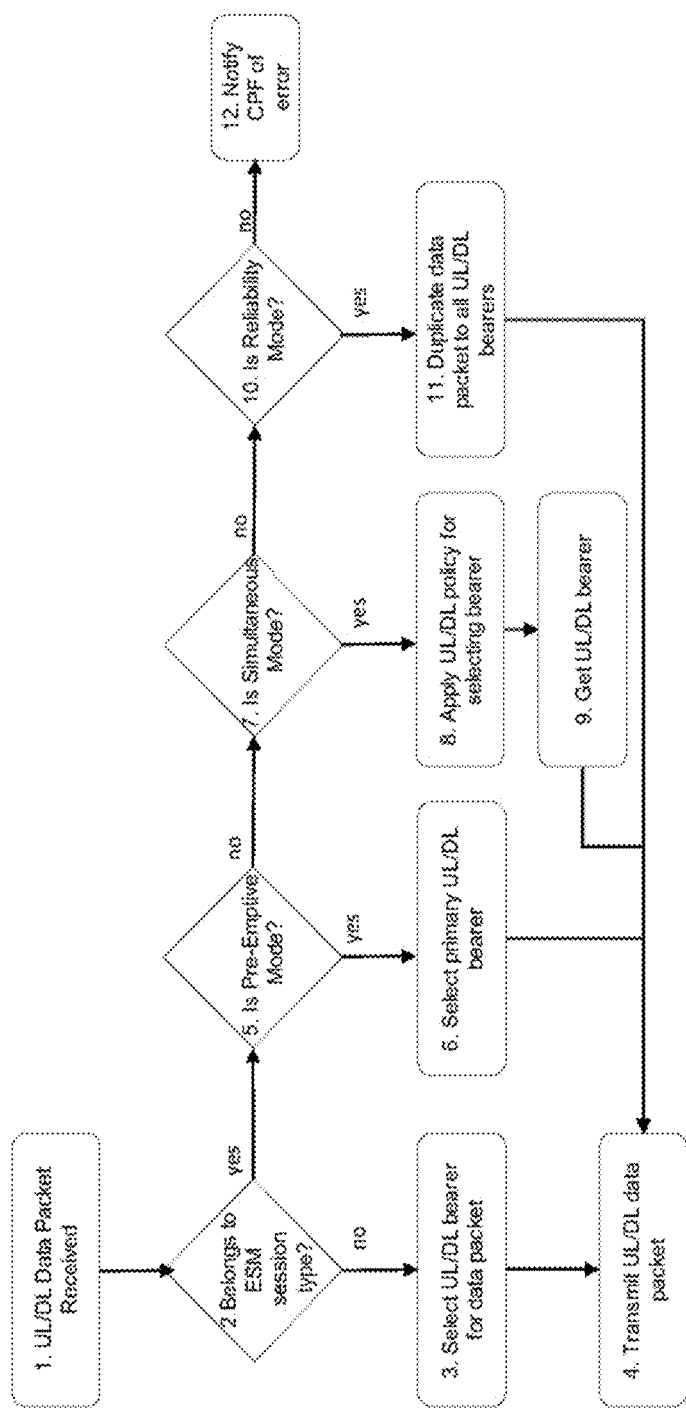
FIG. 12 shows a flow diagram illustrating the processing steps of an UP-STe entity based on an operation mode of the UE according to one embodiment.

FIG. 12 shows a flow diagram illustrating the processing steps of an UP-STe entity based on an operation mode of the UE according to one embodiment.

As depicted in FIG. 12, each UP-STe entity, which comprises a respective mapping table dedicated to the assignment of the multiple transmission bearers at the interface between the AN and the CN, is adapted to perform the following steps:

it receives a UL or DL data packet from the UE in the case of an UL data packet or from the PDN entity in the case of a DL data packet in a first step (denoted by the number "1");

it checks its mapping table in order to identify with which session the UL or DL data packet is associated in a second step (denoted by the number "2");

if the identified session is a session other than the enhanced session (i.e., the ESM), then it selects the only transmission bearer available connecting the UE and the PDN entity in a third step (denoted by the number "3") and it transmits the UL or DL data packet towards the UE in the case of a DL data packet or towards the PDN entity in the case of an UL data packet in a fourth step (denoted by the number "4");

if the identified session is the enhanced session (i.e., the ESM), then it checks whether the operation mode is the preemptive mode in a fifth step (denoted by the number "5"), and if the operation mode is the preemptive mode, then it selects the primary transmission bearers in a sixth step (denoted by the number "6") before transmitting the UL or DL data packet towards the UE in the case of a DL data packet or towards the PDN entity in the case of an UL data packet;

if it checks in a seventh step (denoted by the number "7") that the operation mode is not the preemptive mode but the simultaneous mode, then it checks which policy other than the policy applied at the UE-STe entity should be applied in an eighth step (denoted by the number "8") and selects the transmission bearers based on the applied policy in a ninth step (denoted by the number "9") before transmitting the UL or DL data packet towards the UE in the case of a DL data packet or towards the PDN entity in the case of an UL data packet;

if it checks in a tenth step (denoted by the number "10") that the operation mode is not the simultaneous mode but the reliability mode, then it identifies all the transmission bearers associated with the enhanced session (i.e., the ESM) and duplicates the UL or DL data packet towards all the identified transmission bearers in an eleventh step (denoted by the number "11") before transmitting the UL or DL data packet towards the UE in the case of a DL data packet or towards the PDN entity in the case of an UL data packet;

if it checks in a twelfth step (denoted by the number "12") that the operation mode is neither the preemptive mode nor the simultaneous mode nor the reliability mode, then it sends an error notification towards the CPF entity.

As above-mentioned, the request for the session configuration can be related to the need to change an existing session through a modification or a replacement of the existing session, and such a need can be caused by a handover (HO).

Figure 13:
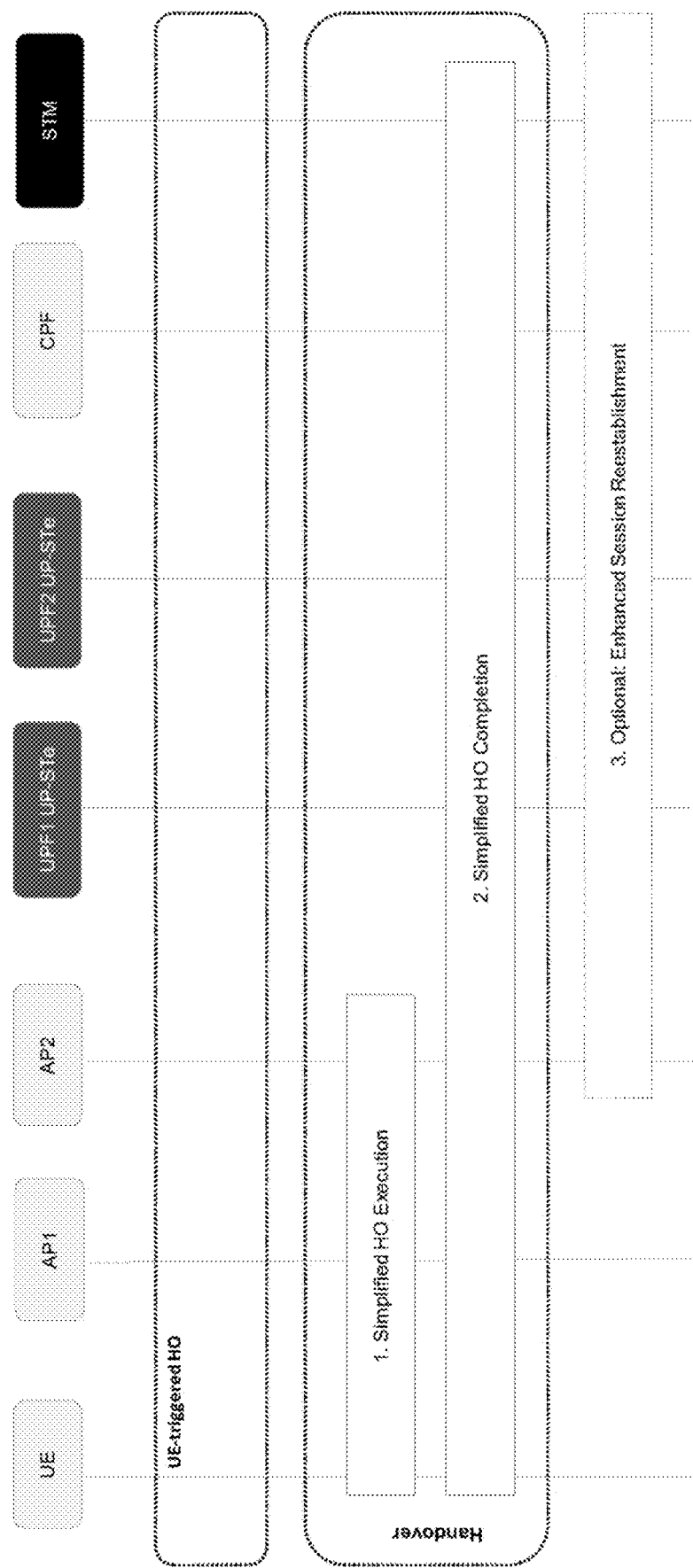
FIG. 13 shows a UE-triggered HO procedure between multiple APs that are all associated with the same ESM and UE-STe entity according to one embodiment.

To that extent, FIG. 13 shows a UE-triggered HO procedure between multiple APs that are all associated with the same ESM and UE-STe entity according to one embodiment.

As depicted therein in the case of a UE-triggered HO, the UE is actually moving from an AP, namely AP1, where it has transmission bearers, towards another AP, namely AP2, where it also has transmission bearers. Thus, the trigger will occur at the AN due to the HO need.

Such a HO procedure relies on the subsequent steps of a simplified HO execution (1), a simplified HO completion (2) and an optional enhanced session re-establishment (3).

Step 1: The HO execution is considered as being simplified because there is a reduction in its number of steps to be carried out. Indeed, there already exists a transmission bearer established between the UE and the target AP (i.e., AP2 in FIG. 13) so that there is no need to execute certain steps (e.g., the step of resource admission) at the target AP.

Step 2: The HO completion is also considered as being simplified because there is no need to request the configuration of transmission bearers of the CN between the target AP and the entities of the CN. Indeed, these transmission bearers are already set up and only minor changes depending on the operation mode of the ESM shall be enforced.

Step 3: The enhanced session re-establishment is optional because it is up to the STM entity to decide whether, taking the target AP (i.e., AP2 in FIG. 13) as basis, there is the need to include other APs as entities of the ESM of the UE that has just moved. If the need to include other APs exists, this means that the STM entity needs to configure the UP-STe and UE-STe entities in order to take also the resources from the included APs and their respective transmission bearers of the CN into consideration.

Figure 14:
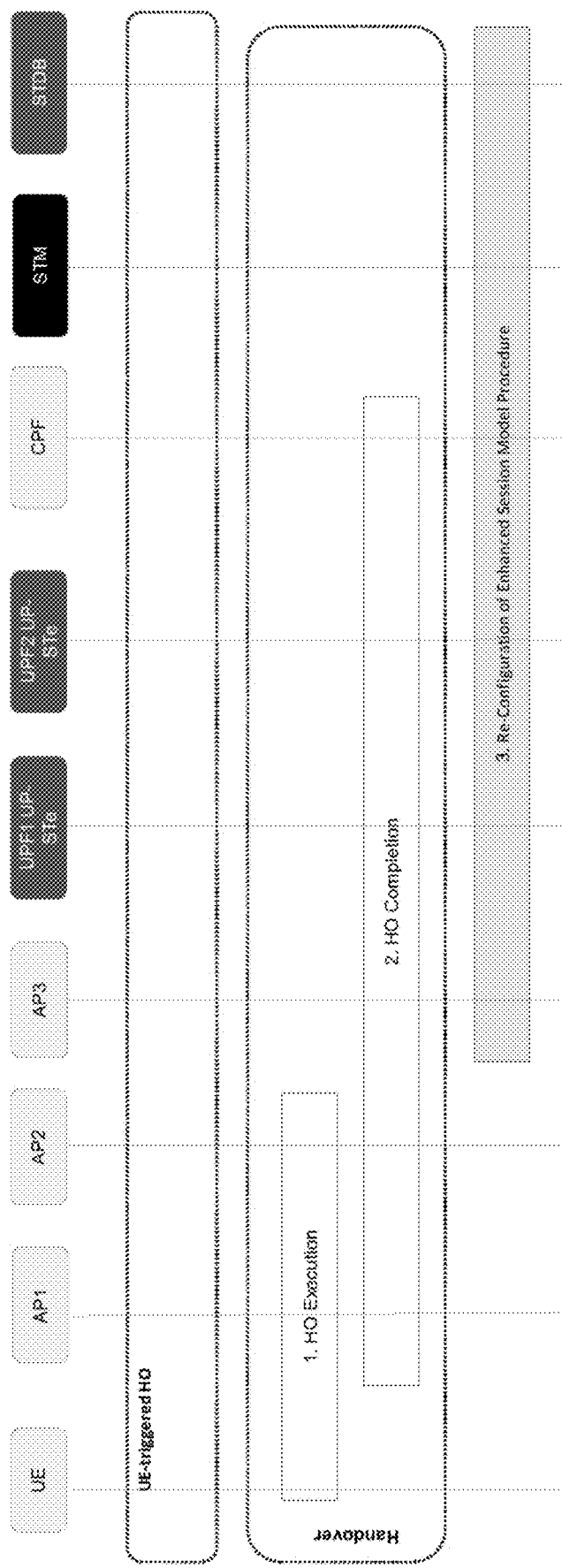
FIG. 14 shows a UE-triggered HO procedure between multiple APs that are not all associated with the same ESM and UE-STe entity according to one embodiment.

FIG. 14 shows a UE-triggered HO procedure between multiple APs that are not all associated with the same ESM and UE-STe entity according to one embodiment.

As depicted therein in the case of a UE-triggered HO, the UE is actually moving from an AP, namely AP1, where it has transmission bearers, via another AP, namely AP2, where it also has transmission bearers, towards an AP, namely AP3, where it has no transmission bearer. Indeed, such an AP (i.e., AP3) is not associated with the same UE-STe entity of the UE as AP1 and AP2, so that it has no resource associated with the ESM that the UE had in its source AP, namely AP1.

Such a HO procedure relies on the subsequent steps of a HO execution (1), a HO completion (2) and a re-configuration of the ESM procedure (3).

Steps 1 and 2: the HO execution and HO completion are carried out according to the current standards such as 3GPP.

Step 3: Afterwards, the proposed procedure of session configuration for the ESM as depicted in FIG. 4 is triggered in order to reorganize the resources of the ESM of the UE as well as indicate the way in which the UE-STe and UP-STe entities need to handle the included transmission bearers from AP3 and the previous transmission bearers related with the UE.

However, the HO procedure depends on the operation mode of the UE.

Thus, when the UE is in the preemptive mode, the HO is triggered in order to change from the primary transmission bearers to the secondary transmission bearers and vice versa as illustrated in FIG. 8(*b*), the primary transmission bearers being used for the transmission of UL and DL data traffic and the secondary transmission bearers being pre-reserved for the possible communications from and towards the UE. Referring to the steps of FIG. 13 in the case of a pre-emptive operation mode, the HO procedure can be more detailed through its milestone steps of simplified HO execution (1), simplified HO completion (2) and (optional) enhanced session re-establishment (3).

Step 1: During the simplified HO execution, the source AP (e.g., AP1 in FIG. 8(*b*)) triggers the HO of the UE with pre-configured AN resources in the target AP (e.g., AP2 in FIG. 8(*b*)). The target AP triggers in parallel the activation of the pre-configured resources in the AN and the CN. The target AP receives the UE context and sends the context release towards the source AP.

Step 2: During the simplified HO completion, the target AP interacts in parallel with the CPF entity (which will further interact with the STM entity) in order to trigger the updates in the UP-STe entities of the CN for updating the DL mapping or assignment at the CN, turning the pre-configured transmission bearers into primary and releasing the previous primary resources.

Step 3: During the (optional) enhanced session re-establishment, the STM entity can decide to re-configure the resources from the transmission bearers related to the previous primary transmission bearers from the source AP as they are now secondary resources for the UE. The STM entity can also decide to include the neighboring APs of the target AP so as to be part of the set of the secondary resources available to the UE and therefore belong to the same ESM.

When the UE is in the simultaneous mode or in the reliability mode, the HO is triggered in order to allow the UE to be connected to an AP that is associated with a session other than the existing enhanced session.

In the case of the simultaneous mode, there is no need to actually trigger a HO procedure when the UE-STe entity is already connected to APs that belong to the same ESM. Indeed, the UE already has the connectivity that it needs. Although changes in the AN conditions may influence the UE-STe policies, they do not trigger HO procedures amongst the already connected APs to such a UE. Nevertheless, the need to trigger a HO procedure is necessary when the UE-STe entity has no transmission bearer associated with an AP that is not included in the ESM. With respect to the UE-STe mapping table, it means that the UE will then need to connect to a different AP that is not associated with the same ESM. In such a latter case, the HO procedure steps of FIG. 14 can apply.

In the case of the reliability mode, the HO is processed in the same way as the simultaneous mode. The HO between APs already linked to the UE-STe entity in the enhanced session does not need to be triggered, whereas the HO between APs that are not linked to the UE-STe entity needs to be triggered and processed by standard HO procedures followed by the proposed procedure of session configuration for the ESM as depicted in FIG. 4, in order to readjust the multiple resources in the single PDU as illustrated in FIG. 14.

In addition to the aforementioned configuration, re-configuration and HO procedures, there also exists a release procedure for resources when these resources are no longer used. This procedure is enforced by the STM entity that informs the CPF entity about the enhanced session configuration information being necessary to be removed from the UE-STe and UP-STe entities. Based on this information, the CPF entity contacts said UE-STe and UP-STe entities and removes from their respective mapping table the entries of the resources (i.e., the transmission bearers associated with those resources) that should be released.

Figure 15A:
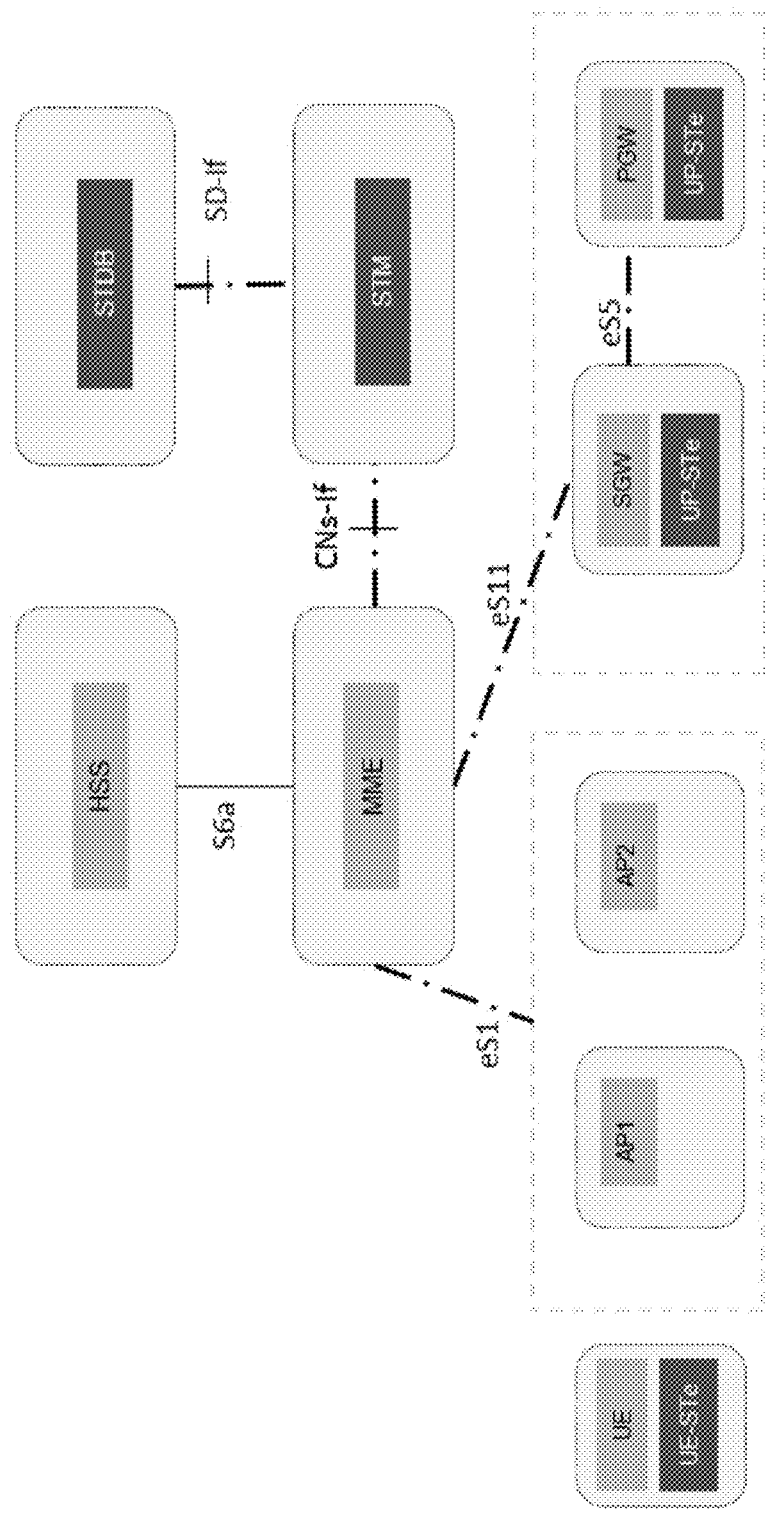
Figure 15B:
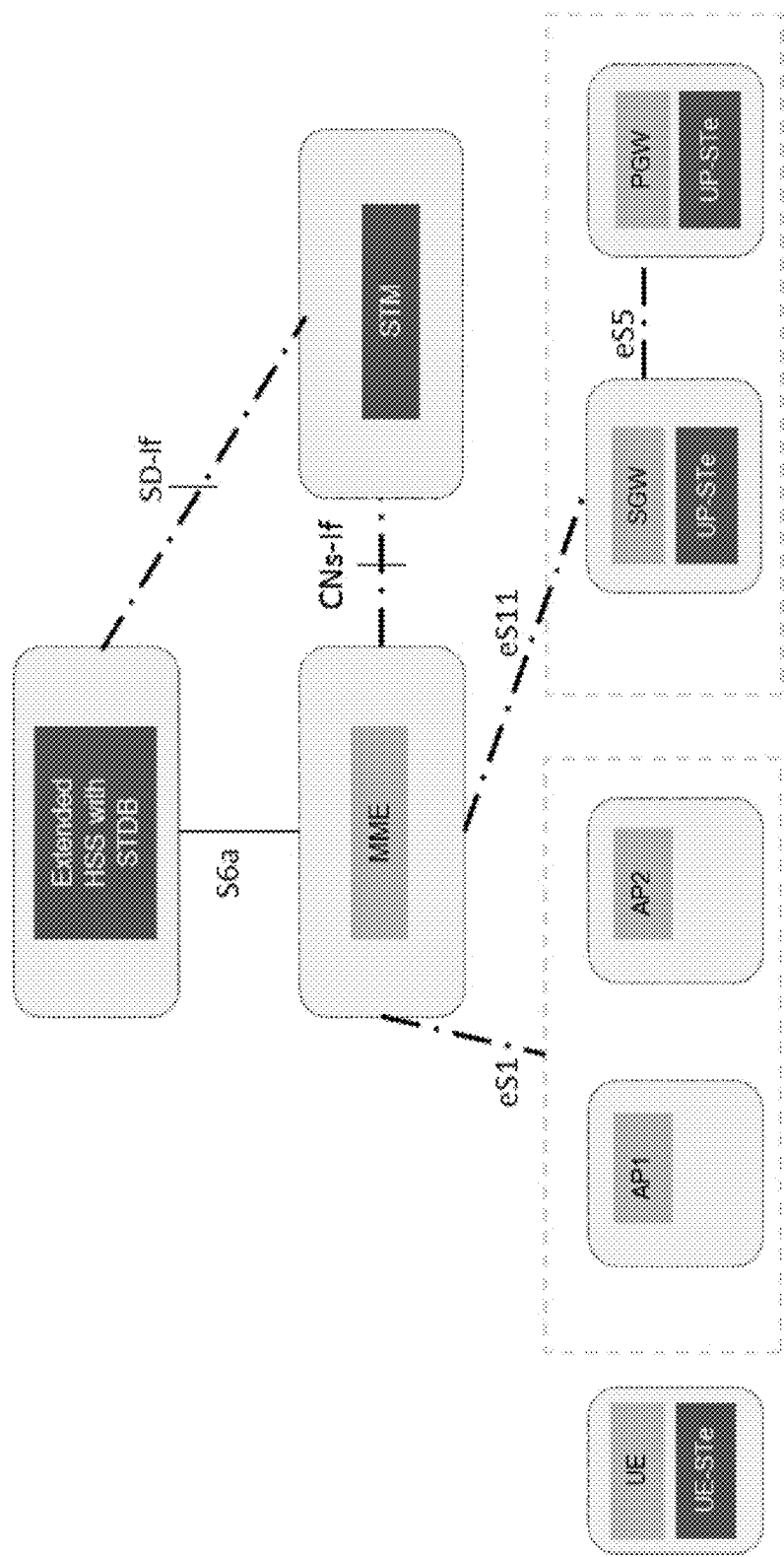

FIG. 15(*a*), FIG. 15(*b*) and FIG. 15(*c*) show different kinds of implementation of the present disclosure into a LTE architecture.

As depicted therein, the present disclosure can be implemented into a LTE architecture according to at least three kinds of implementation, thereby allowing the LTE systems to operate with multiple transmission bearers with the same technology.

In the implementation of FIG. 15(*a*), the STDB and STM entities of the present disclosure as well as their SD-if interface have been added as new entities and interface of the LTE architecture, respectively. Also, the CNs-If interface has been added to the mobility management entity (MME), which is one of the entities of the LTE system that is adapted to control the configuration and re-configuration of sessions. The serving gateway (SGW) entity and the PDN gateway (PGW) entity are also control entities of the LTE system that are adapted to control the PDN sessions. Thus, rather than to add new interfaces from the STM entity to all the control entities (i.e., MME, SGW and PGW) of the LTE system related to the session management, the existing S11 and S5 interfaces of the LTE system have been extended into the enhanced S11 (eS11) and enhanced S5 (eS5) interfaces, thereby allowing the functionalities of the CNs-If interface of the present disclosure to be also added to these existing interfaces of the LTE. In addition, the SGW and PGW entities of the LTE system have been extended with a respective proposed UP-STe entity, thereby allowing the SGW and PGW entities of the LTE system to perform the procedures and operations as well as to support the proposed ESM. Finally, the S1 interface has been also extended into the enhanced S1 (eS1) interface between the evolved node B (eNB) and the MME entity. As the eS1 interface includes also the functionalities of the ANs-If interface of the present disclosure, the MME entity, which can be considered as being equivalent to the CPF entity of the present disclosure, can send towards the UE-STe entity the information necessary for the UE to operate with the multiple transmission bearers.

In the implementation of FIG. 15(*b*) and with respect to the implementation of FIG. 15(*a*), the home subscriber server (HSS) entity has been extended with the functionalities of the STDB of the present disclosure. As a result, the SD-If interface of the present disclosure has been added between the extended HSS entity and the STM entity.

In the implementation of FIG. 15(*c*) and with respect to the implementation of FIG. 15(*a*), the HSS and MME entities have been respectively extended with the functionalities of the STDB and the STM entity of the present disclosure. Thereby, no interface of the present disclosure has been newly added. Nevertheless, the existing S6a interface of the LTE system between the current extended HSS entity and the current extended MME entity has been extended into the enhanced S6a (eS6a) interface, thereby allowing the eS6a interface to provide the functionalities of the SD-If interface of the present disclosure.

In summary, the present disclosure relates to an enhanced session model (ESM) capable of managing the configuration and the usage of a single packet data unit (PDU) session, which is an association between a user equipment (UE) and a packet data network (PDN) entity and is composed of multiple transmission bearers between the access network (AN) and the core network (CN). The latter comprises a session type manager (STM) entity adapted to control the connectivity of these transmission bearers whose assignment is either individual or shared, multiple user plane function (UPF) entities, a session type database (STDB) and a control plane function (CPF) entity. The latter can be functionally separate from the session type manager (STM) entity or extended with its functionalities. The user equipment (UE) and the user plane function (UPF) entities are individually extended with the functionalities of, respectively, a user session type extension (UE-STe) entity and user plane session type extension (UP-STe) entities, which all comprise a respective mapping table dedicated to the assignment and can support the different operation modes of the user equipment (UE) configured by the session type manager (STM) entity. Thereby, the present disclosure has the benefit of enabling the pre-configuration (pre-admission) of multiple branches between the radio access network (RAN) and the core network (CN) for the same user equipment (UE) using the same radio access technology (RAT), by creating an assignment or mapping system amongst these multiple transmission bearers. In addition, the present disclosure enables a better mobility support for ultra-reliable low latency communication (uRLLC) use cases by reducing the procedure steps to re-connect the radio portion of the session of the user equipment (UE) in the target access point (AP) and the path switching in the core network (CN), and by pre-configuring the radio access network (RAN) and the core network (CN) before undertaking any handover (HO). The present disclosure also has the advantage of improving the throughput of applications at the UE side owing to the utilization of simultaneous transmission bearers between the access network (AN) and the core network (CN).

In terms of utilization, the disclosure can be applied to cases related to reliability. For example, the ESM can be used for devices with ultra-reliability services. In another example, when AP1 is not delivering data traffic to the UE according to given requirements, the control plane can trigger a HO between AP1 and AP2 in order to use the pre-configured transmission bearers instead of the primary ones. In addition, the disclosure can be applied to reduce losses and performance degradation of the UE during the procedure of anchoring point re-selection in NextGen mobile Core Networks, and be also applied to guarantee reliability of uRLLC use cases in NextGen.

While the disclosure has been illustrated and described in detail in the drawings and the foregoing description, such illustration and description are to be considered illustrative or exemplary and not restrictive. The disclosure is not limited to the disclosed embodiments. From reading the present disclosure, other modifications will be apparent to a person skilled in the art. Such modifications may involve other features, which are already known in the art and may be used instead of or in addition to features already described herein.

The disclosure has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present disclosure has been described with reference to specific features and embodiments thereof, it is evident that various modifications and combinations can be made thereto without departing from the spirit and scope of the invention. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A device in a core network (CN) of a mobile communication network, the mobile communication network including an access network (AN) and the CN, the device comprising:
   one or more processors coupled to a memory that stores a program, which, when executed by the one or more processors, causes the one or more processors to:
   control a connectivity of multiple transmission bearers over at least two access points (APs) of a same AN technology and the CN, based on a selective assignment of the multiple transmission bearers, wherein the selective assignment of the multiple transmission bearers is amongst at least two transmission bearers from the at least two APs of the same AN technology and at least one transmission bearer of the CN, the at least two transmission bearers from the at least two APs of the same AN technology and the at least one transmission bearer of the CN belonging to a single packet data unit (PDU) session; and
   provide information on an operation mode of a PDU session to be used by a user equipment (UE), the operation mode of the PDU session defining PDU session configuration information for a transmission of a data traffic over the at least two transmission bearers from the at least two APs of the same AN technology and the at least one transmission bearer of the CN.

2. The device of claim 1, wherein the selective assignment of the multiple transmission bearers amongst the at least two transmission bearers from the at least two APs of the same AN technology and the at least one transmission bearer of the CN comprises either an individual assignment, wherein one transmission bearer of the at least two APs of the same AN technology is individually connected to one respective transmission bearer of the at least one transmission bearer of the CN, or a shared assignment, wherein the at least two transmission bearers from the at least two APs of the same AN technology are connected to a same transmission bearer of the at least one transmission bearer of the CN.

3. A device in a core network (CN) of a mobile communication network, the mobile communication network including an access network (AN) and the CN, the device comprising:
   one or more processors coupled to a memory that stores a program, which, when executed by the one or more processors, causes the one or more processors to:
   receive a request for a packet data unit (PDU) session configuration; and
   transmit, towards a user plane function (UPF) entity and a user equipment (UE), based on PDU session configuration information, information about how to set up or change a session of the UE,
   wherein the request for the PDU session configuration is either related to a session or a service request from the UE or related to a need to change an existing session through a modification or a replacement of the existing session, the need to change the existing session being identified at a control plane function (CPF) entity, a session type manager (STM) entity, or a session type database of the CN,
   wherein the PDU session configuration information is related to an operation mode of the session of the UE to be set up, the operation mode being selected by the STM entity as either a preemptive mode or a simultaneous mode or a reliability mode, wherein the preemptive mode is related to a reservation of resources in the multiple transmission bearers between the AN and the CN for the session of the UE to be set up, wherein the simultaneous mode is related to a simultaneous usage of selected transmission bearers amongst the multiple transmission bearers between the AN and the CN, and wherein the reliability mode is related to a redundancy on the transmission of data traffic of the selected transmission bearers amongst the multiple transmission bearers between the AN and the CN.

4. A method within a mobile communication network including an access network (AN) and a core network (CN), the method comprising:

controlling, at a device in the CN, a connectivity of multiple transmission bearers over at least two access points (APs) of a same AN technology and the CN, based on a selective assignment of the multiple transmission bearers, wherein the selective assignment of the multiple transmission bearers is amongst at least two transmission bearers from the at least two APs of the same AN technology and at least one transmission bearer of the CN, the at least two transmission bearers from the at least two APs of the same AN technology and the at least one transmission bearer of the CN belonging to a single packet data unit (PDU) session; and providing, at the device in the CN, information on an operation mode of a PDU session to be used by a user equipment (UE), the operation mode of the PDU session defining PDU session configuration information for a transmission of a data traffic over the at least two transmission bearers from the at least two APs of the same AN technology and the at least one transmission bearer of the CN.

5. The method of claim 4, wherein the controlling the connectivity of the multiple transmission bearers over the at least two APs of the same AN technology and the CN comprises:

receiving, at a control plane function (CPF) entity, a request for a PDU session configuration that is either related to a set-up of the session from the UE connected to the mobile communication network to exchange any uplink and downlink data traffic with a packet data network entity through the AN and the CN, or related to a need to change an existing session through a modification or a replacement of the existing session, the need being identified at the CPF entity, a session type manager (STM) entity, or a session type database interacting with the STM entity;

receiving, at the CPF entity, the PDU session configuration information;

deploying, from the CPF entity, the PDU session configuration information towards a user plane function (UPF) entity of the CN, the at least two APs of the same AN technology, and the UE; and reserving, at the CPF entity, resources of the multiple transmission bearers between the AN and the CN based on the deployed PDU session configuration information.

6. The method of claim 4, wherein the selective assignment of the multiple transmission bearers amongst the at least two transmission bearers from the at least two APs of the same AN technology and the at least one transmission bearer of the CN comprises either an individual assignment, wherein one transmission bearer of the at least two APs of the same AN technology is individually connected to one respective transmission bearer of the at least one transmission bearer of the CN, or a shared assignment, wherein the at least two transmission bearers from the at least two APs of the same AN technology are connected to a same transmission bearer of the at least one transmission bearer of the CN.

* * * * *